(12) United States Patent
Kwak et al.

(10) Patent No.: US 12,493,319 B2
(45) Date of Patent: Dec. 9, 2025

(54) DISPLAY STRUCTURE INCLUDING DIELECTRIC AND ELECTRONIC DEVICE INCLUDING SAME

(71) Applicant: SAMSUNG ELECTRONICS CO., LTD., Suwon-si (KR)

(72) Inventors: Woongeun Kwak, Suwon-si (KR); Jungsik Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 340 days.

(21) Appl. No.: 18/218,962

(22) Filed: Jul. 6, 2023

(65) Prior Publication Data

US 2023/0350454 A1 Nov. 2, 2023

Related U.S. Application Data

(63) Continuation of application No. PCT/KR2022/011476, filed on Aug. 3, 2022.

(30) Foreign Application Priority Data

Aug. 10, 2021 (KR) .......................... 10-2021-0105686

(51) Int. Cl.
*H04B 1/38* (2015.01)
*G06F 1/16* (2006.01)
(Continued)

(52) U.S. Cl.
CPC .......... *G06F 1/1618* (2013.01); *G06F 1/1681* (2013.01); *G06F 1/1683* (2013.01); *G06F 1/1698* (2013.01); *H05K 5/0226* (2013.01)

(58) Field of Classification Search
CPC .... G06F 1/1618; G06F 1/1681; G06F 1/1683; G06F 1/1698; H04M 1/0214;
(Continued)

(56) References Cited

U.S. PATENT DOCUMENTS 8,502,243 B2 * 8/2013 Kim .................. G02F 1/133516
257/E33.068
9,196,948 B2 11/2015 Yamamoto et al.
(Continued)

FOREIGN PATENT DOCUMENTS

CN 109712529 A 5/2019
CN 110138938 A 8/2019
(Continued)

OTHER PUBLICATIONS

International Search Report and Written Opinion for International Application No. PCT/KR2022/011476; International Filing Date Aug. 3, 2022; Date of Mailing Nov. 16, 2022; 8 Pages.
(Continued)

*Primary Examiner* — Tuan Pham
(74) *Attorney, Agent, or Firm* — CANTOR COLBURN LLP

(57) ABSTRACT

An electronic device may include a housing including a first housing forming a first side surface, a second housing forming a second side surface and a hinge connecting the first housing and the second housing. The housing switches between folding or unfolding states. A display is coupled with the housing and may include a glass cover for forming a part of a front surface and a first layer. The first layer includes a first area with a lattice pattern and a second area. A first edge of the first area is spaced from the first side surface by a first distance. A second edge of the second area is spaced from the first side surface by a second distance. A part of the housing may be grounded through a conductive member disposed at a first point spaced away from the first side surface by a third distance.

20 Claims, 18 Drawing Sheets

(51) Int. Cl.
*H04M 1/00* (2006.01)
*H05K 5/02* (2006.01)

(58) Field of Classification Search
CPC ............ H04M 1/0216; H04M 1/0218; H04M 1/0222; H04M 1/0266; H04M 1/0268
See application file for complete search history.

(56) References Cited

U.S. PATENT DOCUMENTS

| | | |
|---|---|---|
| 9,317,074 B2 | 4/2016 | Ji et al. |
| 9,437,840 B2 * | 9/2016 | Choi ..................... H10K 59/40 |
| 10,312,571 B2 | 6/2019 | Edwards et al. |
| 10,725,595 B2 | 7/2020 | Schooley et al. |
| 10,848,603 B2 | 11/2020 | Liu et al. |
| 10,921,677 B2 | 2/2021 | Lin et al. |
| 10,983,563 B2 | 4/2021 | Shin et al. |
| 11,540,387 B2 | 12/2022 | Oh et al. |
| 11,908,350 B2 * | 2/2024 | Wu ......................... G09F 9/301 |
| 12,007,814 B2 | 6/2024 | Kim |
| 2011/0032169 A1 | 2/2011 | Ryou et al. |
| 2019/0103656 A1 | 4/2019 | Shi et al. |
| 2019/0319367 A1 | 10/2019 | Edwards et al. |
| 2020/0119429 A1 | 4/2020 | Park et al. |
| 2020/0313111 A1 | 10/2020 | Kim et al. |
| 2021/0195739 A1 | 6/2021 | Bae et al. |
| 2022/0201874 A1 | 6/2022 | You et al. |

FOREIGN PATENT DOCUMENTS

| | | |
|---|---|---|
| JP | 5117594 B2 | 10/2012 |
| KR | 100992405 B1 | 11/2010 |
| KR | 20200018282 A | 2/2020 |
| KR | 20210016983 A | 2/2021 |
| KR | 20210031224 A | 3/2021 |
| KR | 20210040699 A | 4/2021 |
| KR | 20220091665 A | 7/2022 |
| KR | 20220113226 A | 8/2022 |

OTHER PUBLICATIONS

Extended European Search Report Issued In EP Application No. 22856097.5-1201, Mail Date Sep. 26, 2024, 6 Pages.

* cited by examiner

DISPLAY STRUCTURE INCLUDING DIELECTRIC AND ELECTRONIC DEVICE INCLUDING SAME

CROSS-REFERENCE TO RELATED APPLICATION(S)

This application is a continuation application, claiming priority 5 under § 365(c), of International Application No. PCT/KR2022/011476, filed on Aug. 3, 2022, which is based on and claims the benefit of Korean patent application number 10-2021-0105686 filed on Aug. 10, 2021, in the Korean Intellectual Property Office, the disclosures of which are incorporated by reference herein in their entireties.

TECHNICAL FIELD

Various embodiments of the present disclosure relate to a display structure including a dielectric and an electronic device including the same.

BACKGROUND ART

As processing performance of electronic devices, such as smart phones, rapidly increase, a large screen is often preferred to effectively provide for various functions. At the same time, needs for miniaturization of the electronic device still exist to improve portability. Thus, a foldable electronic device is provided to satisfy both of these competing needs. That is, a foldable electronic device, which may be folded or unfolded based on a connection portion, may provide a user with both portability and usability.

Meanwhile, with advances of mobile communication technology, an electronic device including an antenna is widely supplied. The electronic device may transmit and/or receive a radio frequency (RF) signal including a voice signal or data (e.g., a message, a photo, a video, a music file, or a game) using the antenna.

Efforts are also being exerted to increase a rigidity of the electronic device to satisfy consumer's purchase desire, to enhance design aspects and to achieve slimness at the same time. As part of such efforts, the electronic device supplies power to at least a part of a metal housing of the electronic device, and thus utilizes it as at least one antenna device for communication of the electronic device.

DISCLOSURE

Technical Problem

A foldable electronic device which utilizes at least a part of a frame or a housing as an antenna radiator according to an embodiment, may include a metal layer for acquiring rigidity of a flexible display and for protecting a display structure. Notably, as this metal layer occupies over 50% of the display structure, a weight of the electronic device may be reduced by changing the material of the metal layer to a lightweight material.

However, if the metal layer is formed with such a lightweight material, the corresponding lightweight material may have high permittivity. As the metal layer is formed with the material having the high permittivity, radiation performance of an antenna adjacent to this metal layer may be degraded.

Various embodiments disclosed in this document may prevent antenna performance degradation by spacing edges of the metal layer including a dielectric from the housing.

Technical Solution

An electronic device according to an embodiment may include a housing including a first housing which forms a first side surface of the electronic device, a second housing which forms a second side surface corresponding to the first side surface and a hinge which connects the first housing and the second housing, and switches between a folding state or an unfolding state based on the hinge, a wireless communication circuit disposed inside the housing, and transmitting and receiving signals of a designated frequency band by supplying power to at least a part of the housing, and a display structure coupled with the housing, the display structure may include a cover glass for forming at least a part of a front surface of the electronic device, a display panel disposed adjacent to one surface of the cover glass, and a first layer disposed below the display panel, and including a dielectric, the first layer may include a first area adjacent to the hinge and including a lattice pattern and a second area excluding the first area, a first edge of the first area may be spaced away from the first side surface by a first distance, a second edge of the second area may be spaced away from the first side surface by a second distance which is greater than the first distance, and at least a part of the housing may be connected with a ground through a conductive connection member disposed at a first point spaced away from the first side surface by a third distance which is smaller than the first distance.

An electronic device according to an embodiment may include a housing including a first housing which forms a first side surface of the electronic device, a second housing which forms a second side surface corresponding to the first side surface and a hinge which connects the first housing and the second housing, and switches between a folding state or an unfolding state based on the hinge, a printed circuit board inside the housing, a wireless communication circuit electrically connected with the printed circuit board, and transmitting and receiving signals of a designated frequency band by supplying power to at least a part of the housing, and a display structure coupled with the housing, the display structure may include a cover glass for forming at least a part of a front surface of the electronic device, a display panel disposed adjacent to one surface of the cover glass, and a first layer disposed below the display panel, and including a dielectric, the first layer may include a first area adjacent to the hinge and including a lattice pattern and a second area excluding the first area, a first edge of the first area may be spaced away from the first side surface by a first distance, a second edge of the second area may be spaced away from the first side surface by a second distance which is greater than the first distance, and at least a part of the housing is electrically connected with a first point of the printed circuit board, spaced away from the first side surface by a third distance which is smaller than the first distance.

An electronic device according to an embodiment may include a housing including a first housing which forms a first side surface of the electronic device, a second housing which forms a second side surface corresponding to the first side surface and a hinge which connects the first housing and the second housing, and switches between a folding state or an unfolding state based on the hinge, a wireless communication circuit disposed inside the housing, and transmitting and receiving signals of a designated frequency band by supplying power to at least a part of the housing, and a display structure coupled with the housing, the display structure may include a cover glass for forming at least a part of a front surface of the electronic device, a display panel disposed adjacent to one surface of the cover glass, and a first layer disposed below the display panel, and including a dielectric, the first layer may include a first area including a lattice pattern formed adjacent to the hinge, a second area including a second lattice pattern formed away or separated at a distance from the first lattice pattern and a third area formed between the first area and the second area, a first edge of the first area and a second edge of the second area may be spaced away from the first side surface by a first distance, a third edge of the third area may be spaced away from the first side surface by a second distance which is greater than the first distance, and at least a part of the housing may be connected with a ground through a conductive connection member disposed at a first point spaced away from the first side surface by a third distance which is smaller than the first distance.

Advantageous Effects

According to various embodiments of the present disclosure, antenna performance degradation may be prevented by applying a lightweight material to a metal layer, changing its structure, and then implementing an antenna structure.

Also, according to various embodiments, damage or deformation which may be exerted to a display may be reduced by applying a lightweight material to a metal layer and changing its structure.

Besides, various effects directly or indirectly obtained through the present disclosure may be provided.

DESCRIPTION OF DRAWINGS

Regarding descriptions of drawings, identical or similar reference numerals may be used for identical or similar components.

MODE FOR INVENTION

Hereafter, various embodiments of the present invention are described by referring to the attached drawings. However, it should be understood that the present invention is not limited to specific embodiments, and embraces various modification, equivalents, and/or alternatives of embodiments of the present invention.

Figure 1:
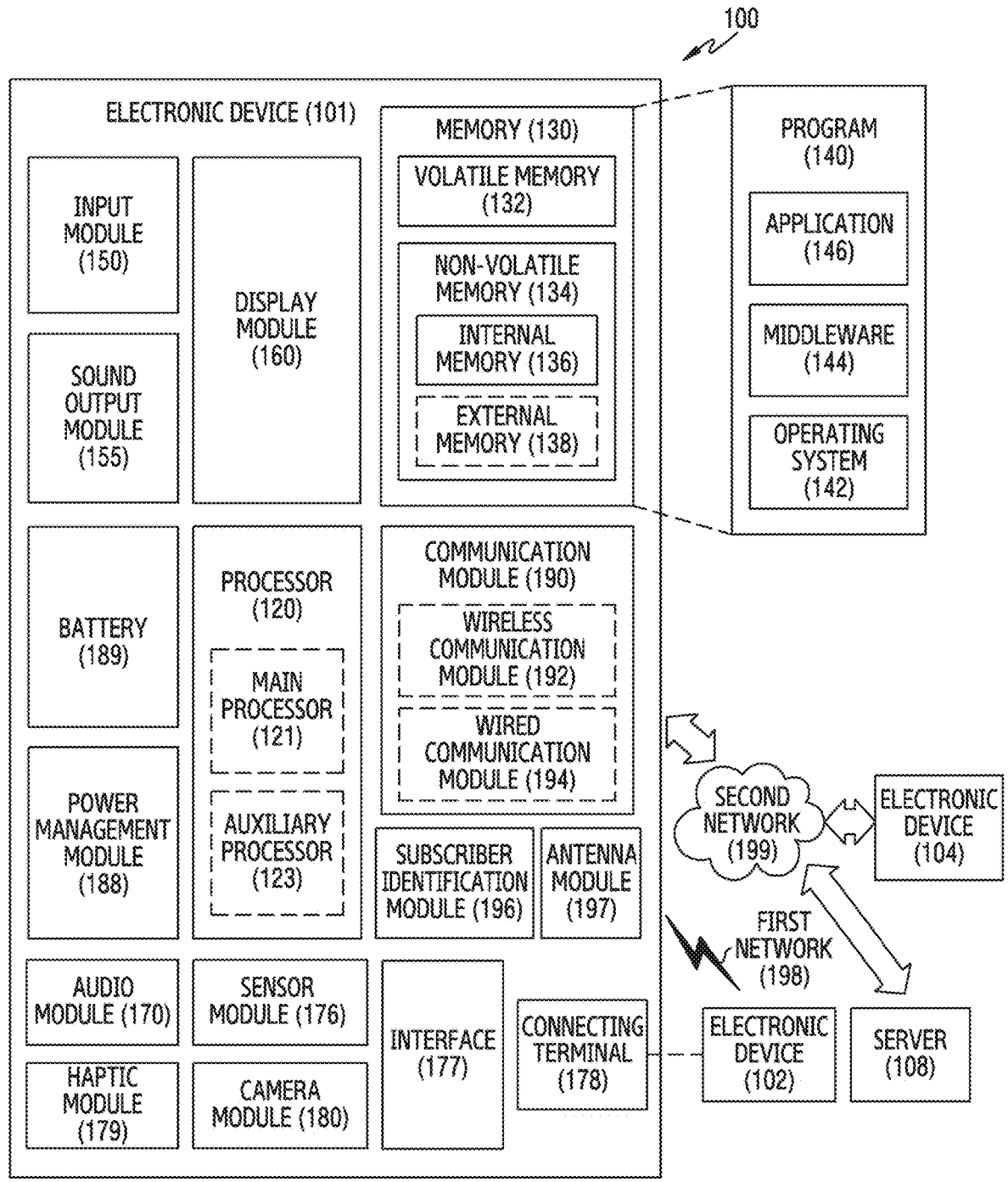
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
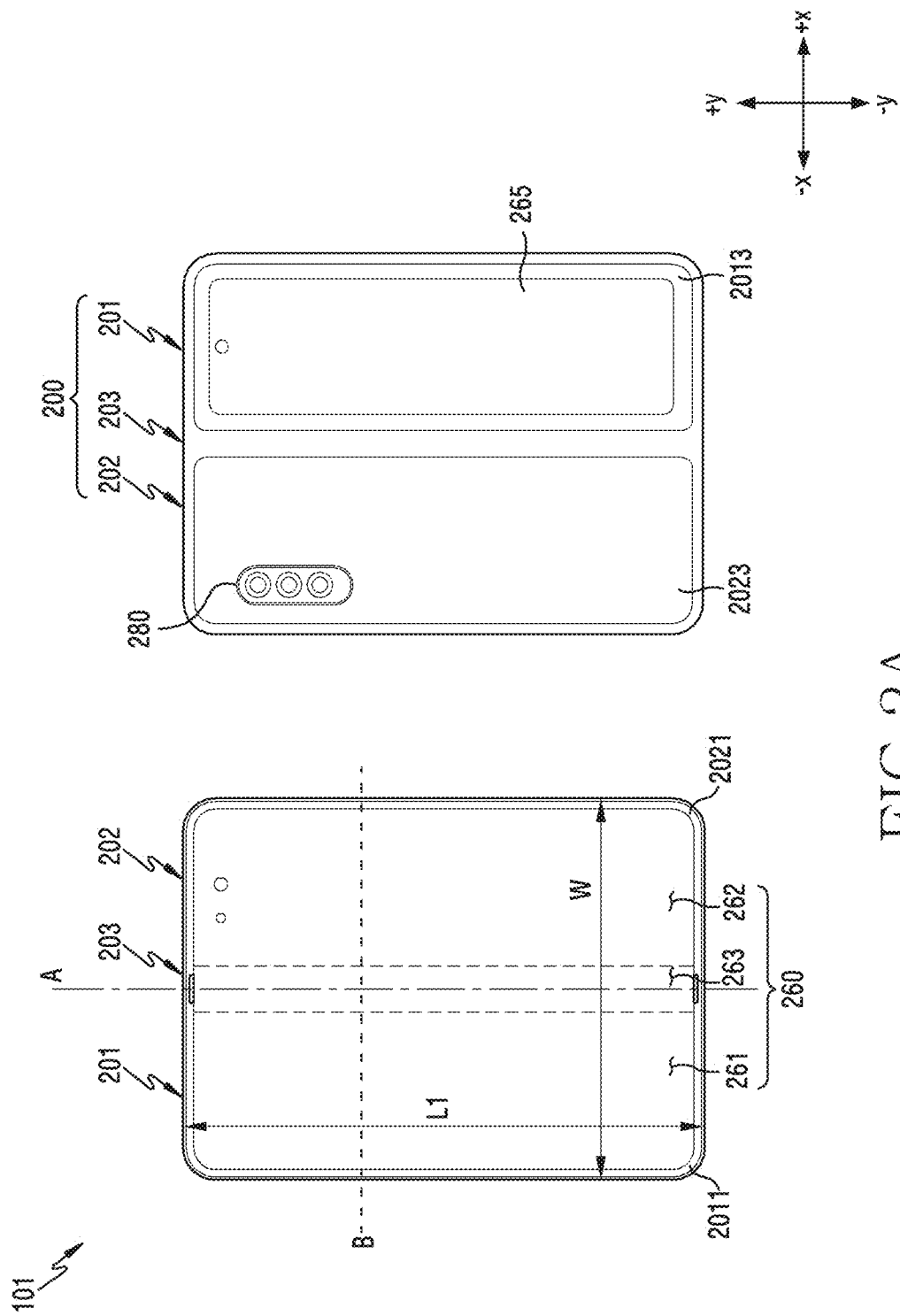
FIG. 2A illustrates an electronic device in an unfolded state according to an embodiment.
Figure 2B:
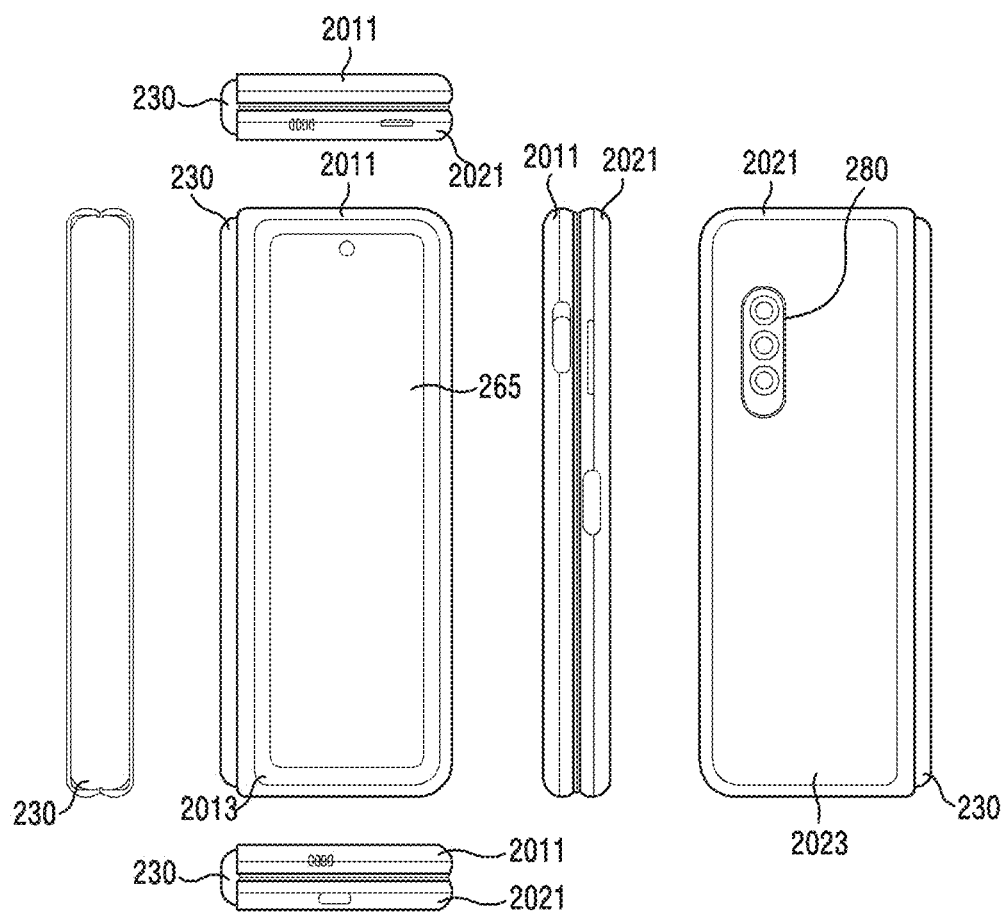
FIG. 2B illustrates an electronic device in a folded state according to an embodiment.
Figure 2C:
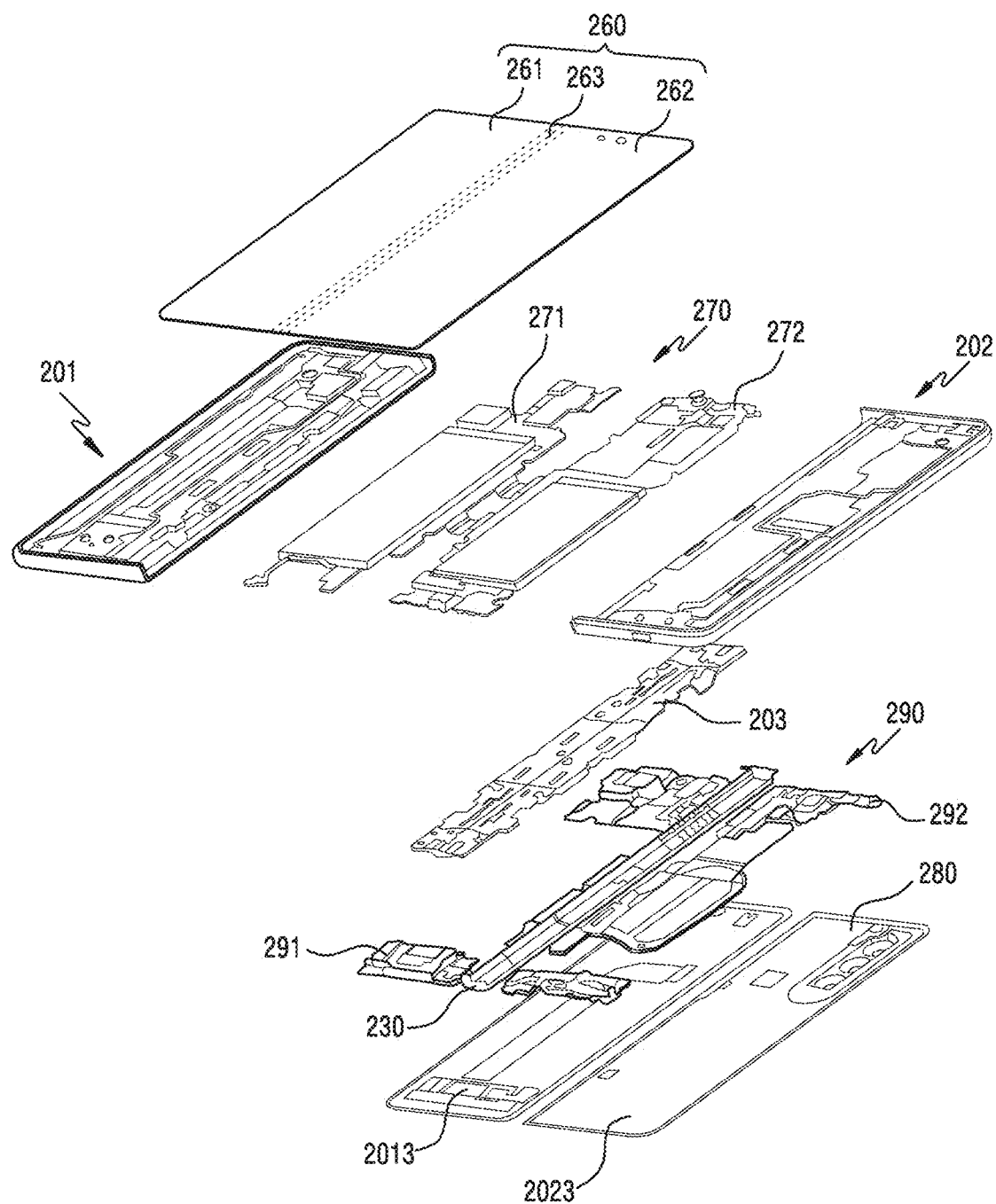
FIG. 2C is an exploded perspective view of an electronic device according to an embodiment.

FIG. 2A illustrates an electronic device in an unfolded state according to an embodiment. FIG. 2B illustrates the electronic device in a folded state according to an embodiment. FIG. 2C is an exploded perspective view of the electronic device according to an embodiment.

Referring to FIG. 2A and FIG. 2B together, in an embodiment, an electronic device 101 may include a foldable housing 200 (hereinafter referred to as the "housing" 200) and a flexible or foldable display 260 (hereinafter referred to as the "display" 260) disposed in a space formed by the housing 200. As used herein, a surface where the display 260 is disposed is defined as a first surface or a front surface of the electronic device 101. The opposite surface of the front surface is defined as a second surface or a rear surface of the electronic device 101. In addition, a surface surrounding a space between the front surface and the rear surface is defined as a third surface or a side surface of the electronic device 101.

In an embodiment, the housing 200 may have a substantially rectangular shape, in the unfolded state of FIG. 2A. For example, the housing 200 may have a designated width W and a designated length L1 which is longer than the designated width W. As another example, the housing 200 may have a designated width W and a designated length L1 which is substantially equal to or shorter than the designated width W. For example, the designated width W may be a width of the display 260. In an embodiment, the housing 200 of the electronic device 101 may be folded or unfolded about a folding axis A which is substantially parallel to a long edge (e.g., an edge facing the Y axis direction among edges of the housing 200 of the electronic device 101 in FIG. 2A) of the rectangle.

In an embodiment, the housing 200 may include a first housing 201, a second housing 202, and a connection portion 203. The connection portion 203 may be interposed between the first housing 201 and the second housing 202. The connection portion 203 may be coupled with the first housing 201 and the second housing 202, and the first housing 201 and/or the second housing 202 may rotate about the connection portion 203 (or the folding axis A).

In an embodiment, the first housing 201 may include a first side member 2011 and a first rear cover 2013. In an embodiment, the second housing 202 may include a second side member 2021 and a second rear cover 2023.

In an embodiment, the first side member 2011 may extend along edges of the first housing 201, and form at least part of the side surface of the electronic device 101. The first side member 2011 may include at least one conductive portion formed with a conductive material (e.g., metal). The conductive portion may serve as an antenna radiator for transmitting and/or receiving a radio frequency (RF) signal. Similarly to the first side member 2011, the second side member 2021 may form a part of the side surface of the electronic device 101, and at least a part of the second side member 2021 may be formed with a conductive material to serve as an antenna radiator.

In an embodiment, the first side member 2011 and the second side member 2021 may be disposed on both sides of the folding axis A, and may have a substantially symmetric shape with respect to the folding axis A.

In an embodiment, an angle or a distance of the first side member 2011 and the second side member 2021 may differ depending on whether the state of the electronic device 101 is the unfolded state, the folded state, or an intermediate state.

In an embodiment, the housing 200 may form a recess for accommodating the display 260. The recess may correspond to a shape of the display 260.

In various embodiments, components disposed inside the electronic device 101 may include various sensors. The sensors may include, for example, at least one of a front camera, a receiver or a proximity sensor.

In an embodiment, the first rear cover 2013 may be disposed in the first housing 201 on the rear surface of the electronic device 101. The first rear cover 2013 may have substantially rectangular edges. Similarly to the first rear cover 2013, the second rear cover 2023 may be disposed in the second housing 202 on the rear surface of the electronic device 101.

In an embodiment, the first rear cover 2013 and the second rear cover 2023 may have a substantially symmetrical shape about the folding axis A. Notably, the first rear cover 2013 and the second rear cover 2023 do not always have a symmetrical shape, and the electronic device 101 may include the first rear cover 2013 and/or the second rear cover 2023 of various shapes, in another embodiment. In yet another embodiment, the first rear cover 2013 may be integrated with the first side member 2011, and the second rear cover 2023 may be integrated with the second side member 2021.

In an embodiment, the first rear cover 2013, the second rear cover 2023, the first side member 2011, and the second side member 2021 may form a space for mounting various components (e.g., a printed circuit board, or a battery) of the electronic device 101.

In an embodiment, one or more components may be disposed or visually exposed in the rear surface of the electronic device 101. For example, at least a part of a sub display 265 may be visually exposed through at least one area of the first rear cover 2013. For example, the sub display 265 may be visually exposed through the whole area of the first rear cover 2013, but the exposed area of the sub display 265 is not limited to the above example. As another example, a rear cover 280 may be visually exposed through at least one area of the second rear cover 2023. As yet another example, the rear cover 280 may be disposed in one area of the rear surface of the electronic device 101.

The housing 200 of the electronic device 101 is not limited to the shape and the coupling shown in FIG. 2A and FIG. 2B, and may be implemented by a combination and/or a coupling of other shapes or components.

Referring to FIG. 2B, the connection portion 203 may be implemented to rotate the first housing 201 and the second housing 202. For example, the connection portion 203 may include a hinge coupled with the first housing 201 and the second housing 202. In an embodiment, the connection portion 203 may include a hinge cover 203 disposed between the first side member 2011 and the second side member 2021, and covering inner components (e.g., the hinge). In an embodiment, the hinge cover 230 may be covered by parts of the first side member 2011 and the second side member 2021, or exposed to outside, depending on the state (the flat state or the folded state) of the electronic device 101. For example, the hinge cover 230 may change a size of its area that is exposed to the outside, according to the state (the flat state or the folded state) of the electronic device 101.

For example, if the electronic device 101 is unfolded as shown in FIG. 2A, at least a part of the hinge cover 230 may be covered by the first side member 2011 and the second side member 2021 so as not to be exposed. For example, if the electronic device 101 is folded as shown in FIG. 2B, the hinge cover 230 may be exposed to the outside between the first side member 2011 and the second side member 2021. For example, in the intermediate state where the first side member 2011 and the second side member 2021 are folded with a certain angle, a part of the hinge cover 230 may be exposed in part to the outside between the first side member 2011 and the second side member 2021. In this case, the exposed area of the hinge cover 230 may be smaller than that of the fully folded state of FIG. 2B.

In an embodiment, the display 260 may be disposed in the space formed by the housing 200. For example, the display 260 may be mounted on the recess formed by the housing 200, to form most of the front surface of the electronic device 101. For example, the front surface of the electronic device 101 may include the display 260 and some area of the first side member 2011 and some area of the second side surface 2021 which are adjacent to the display 260. As another example, the rear surface of the electronic device 101 may include the first rear cover 2013, some area of the first side member 2011 adjacent to the first rear cover 2013, the second rear cover 2023 and some area of the second side member 2021 adjacent to the second rear cover 2023.

In an embodiment, the display 260 may include a flexible display of which at least some area may be transformed into a flat surface or a curved surface. In an embodiment, the display 260 may include a folding area 263, a first area 261 and a second area 262. The folding area 263 may be extended along the folding axis A, the first area 261 may be disposed on one side (e.g., a left side of the folding area 263 shown in FIG. 2A) of the folding area 263, and the second area 262 may be disposed on the other side (e.g., a right side of the folding area 263 shown in FIG. 2A). As yet another example, the first area 261 may be an area disposed in the first housing 201, and the second area 262 may be an area disposed in the second housing 202. The folding area 263 may be an area disposed in the connection portion 203.

The area division of the display 260 shown in FIG. 2A and FIG. 2B is exemplary, and the display 260 may be divided into a plurality of (e.g., four or more or two) areas according to its structure or function. For example, the embodiment shown in FIG. 2A may divide the areas of the display 260 by the folding area 263 or the folding axis A, but the display 260 may divide areas based on another folding area or another folding axis in another embodiment.

In an embodiment, the first area 261 and the second area 262 may have a symmetric shape about the folding axis 263. Notably, unlike the first area 261, the second area 262 may include a cut notch according to presence of a sensor area 234, but may have a symmetric shape with the first area 261 in other areas. For example, the first area 261 and the second area 262 may include a portion having a symmetric shape, and a portion having an asymmetric shape.

Hereafter, the operations of the first side member 2011 and the second side member 2021 and each area of the display 260 according to the state (e.g., the flat state and the unfolded state) of the electronic device 101 are described.

In an embodiment, if the electronic device 101 is in the flat state (e.g., FIG. 2A), the first side member 2011 and the second side member 2021 may be disposed to form the angle of about 180 degrees and to face substantially the same direction. The surface of the first area 261 and the surface of the second area 262 of the display 260 may form about 180 degrees, and face substantially the same direction (e.g., the front direction of the electronic device). For example, the folding area 263 may form the same plane as the first area 261 and the second area 262.

In an embodiment, if the electronic device 101 is in the folded state (e.g., FIG. 2B), the first side member 2011 and the second side member 2021 may be disposed to face each other. The surface of the first area 261 and the surface of the second area 262 of the display 260 may form a narrow angle (e.g., between 0 degree and 10 degrees), and face each other. The folding area 263 may include a curved surface of which at least a part has specific curvature.

In an embodiment, if the electronic device 101 is in the intermediate state, the first side member 2011 and the second side member 2021 may be disposed at a certain angle. The surface of the first area 261 and the surface of the second area 262 of the display 260 may form an angle greater than the folded state and smaller than the unfolded state. The folding area 263 may include a curved surface of which at least a part has specific curvature, wherein the curvature may be smaller than the folded state.

Referring to FIG. 2C, in an embodiment, the electronic device 101 may include the display 260, a bracket assembly 290, a board unit 270, the first housing 201, the second housing 202, the first rear cover 2013 and the second rear cover 2023. In this document, the display 260 may be referred to as a display module or a display assembly.

The bracket assembly 290 may include a first bracket 291, a second bracket 292, the hinge structure (or the connection portion) 203 disposed between the first bracket 291 and the second bracket 292, the hinge cover 230 for covering the hinge structure when the hinge structure is viewed from outside, and a wiring member (e.g., a flexible printed circuit (FPC)) for crossing the first bracket 291 and the second bracket 292.

In an embodiment, the first bracket 291 may be disposed between the first area 261 of the display 260 and a first substrate 271. The second bracket 292 may be disposed between the second area 262 of the display 260 and a second substrate 272.

The board unit 270 according to an embodiment may include the first substrate 271 disposed on the side of the first bracket 291 and the second substrate 272 disposed on the side of the second bracket 292, as mentioned above. The first substrate 271 and the second substrate 272 may be disposed inside a space formed by the bracket assembly 290, the first housing 201, the second housing 202, a first rear cover 580 and a second rear cover 590. Components for implementing various functions of the electronic device 101 may be mounted on the first substrate 271 and the second substrate 272.

The first housing 201 and the second housing 202 may be assembled to couple with both sides of the bracket assembly 290, with the display 260 coupled to the bracket assembly 290. The first housing 201 and the second housing 202 may slide on both sides of the bracket assembly 290 to couple with the bracket assembly 290, to be explained.

Figure 3:
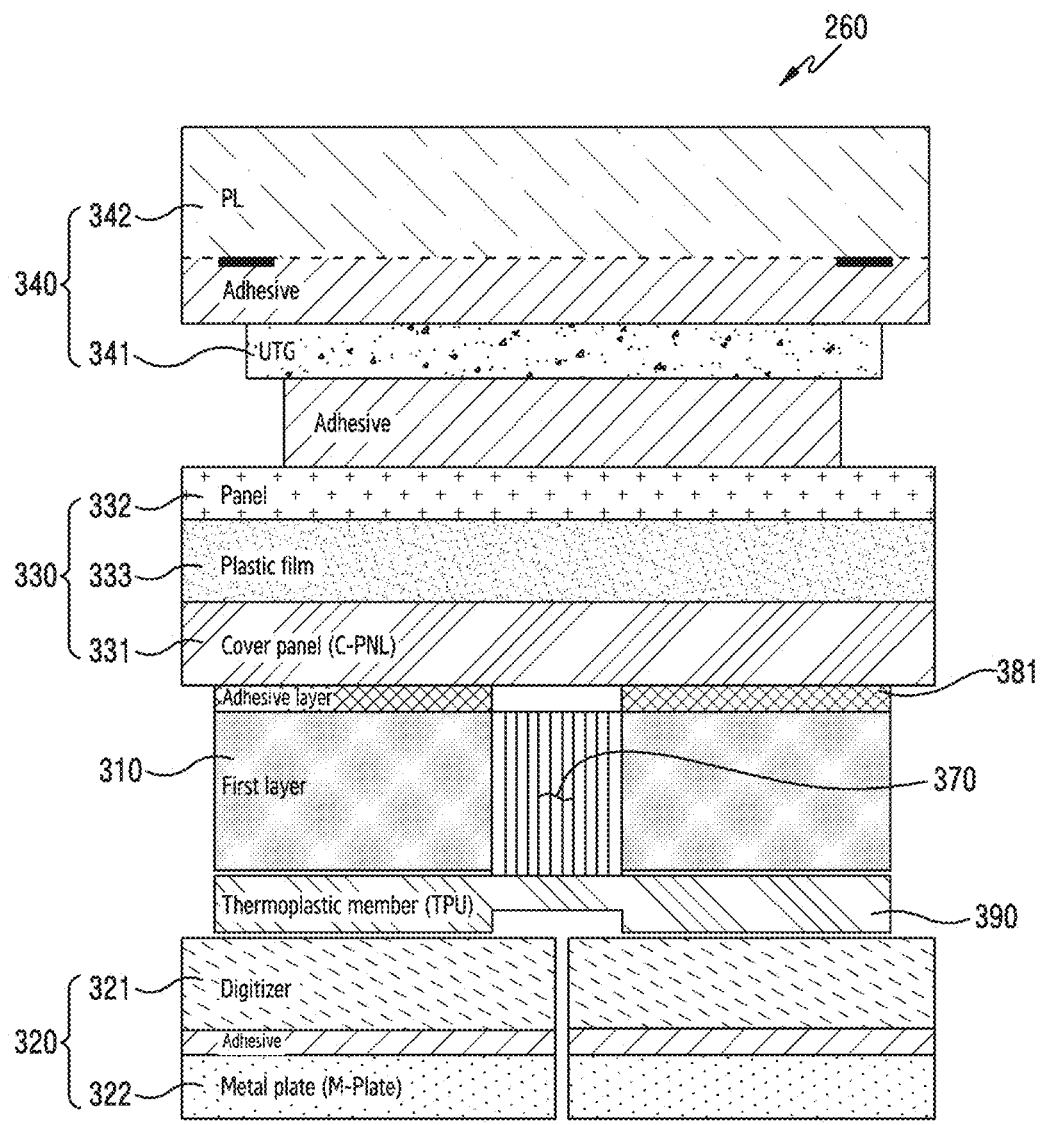
FIG. 3 is a cross-sectional view of a display taken along an axis B of FIG. 2A according to an embodiment.

FIG. 3 is a cross-sectional view of a display taken along an axis B of FIG. 2A according to an embodiment.

Referring to FIG. 3, a display 260 (or a display structure) according to an embodiment may include a plurality of layers. According to an embodiment, the display 260 may include a cover glass 340, a display panel 330 disposed adjacent to one surface of the cover glass 340, and a first layer 310 disposed below the display panel 330. The display 260 according to an embodiment may include a second layer 320 disposed below the first layer 310. According to another embodiment (not shown), some (e.g., a thermoplastic member 390) of the above configurations may be omitted, and other configuration may be added.

According to an embodiment, the display 260 may include an adhesive (e.g., a pressure sensitive adhesive (PSA)) for coupling the plurality of the layers. According to another embodiment, the adhesive may include, but not limited to, an optically clear adhesive (OCA), a heat sensitive adhesive, or a double-sided tape besides the PSA.

According to an embodiment, the cover glass 340 may include a film layer 342 and a transparent plate 341 (e.g., an ultra-thin glass (UTG)) exposed at least in part through the front surface of the electronic device 101. The film layer 342 and the transparent plate 341 according to an embodiment may be coupled or adhered to one another by an adhesive. According to an embodiment, the film layer 342 and the transparent plate 341 may be flexible and able to be folded or bent. For example, the film layer 342 may be referred to as, but not limited to, a protection film for protecting the transparent plate 341.

According to an embodiment, the display panel 330 may include a panel 332, a plastic film 333 disposed below the panel 332 and a cover panel 331 disposed below the plastic film 333. According to an embodiment, the plastic film 333 may include an adhesive (e.g., a pressure sensitive adhesive or PSA) to bond the panel 332 and the cover panel 331. According to an embodiment, the plastic film 333 may be referred to as a protection film for protecting the display 260 from a shock. According to an embodiment, the cover panel 331 may be referred to as, but not limited to, a crack protection layer for softening shock as the state of the electronic device 101 is switched between the unfolded state (e.g., the flat state of FIG. 2A) and the folded state (e.g., the folded state of FIG. 2B).

According to an embodiment, the panel 332 may be implemented with a touch panel including electrodes for receiving a touch input, fingerprint recognition, or a pen input. According to an embodiment, the panel 332 may include an organic light emitting diodes (OLED) panel, a liquid crystal display (LCD), or a quantum dot light-emitting diodes (QLED) panel. For example, the display panel 330 may include a plurality of pixels for displaying an image, and one pixel may include a plurality of sub-pixels. For example, one pixel may include a red sub-pixel, a green sub-pixel, and a blue sub-pixel. As another example, one pixel may be arranged in an RGBG PenTile manner, including one red sub-pixel, two green sub-pixels, and one blue sub-pixel.

According to an embodiment, the display 260 may include the first layer 310 disposed below the display panel 330. According to an embodiment, an adhesive layer 381 may be disposed between the display panel 330 and the first layer 310, to bond the first layer 310 below the display panel. The adhesive layer 381 according to an embodiment may have a shape corresponding to a shape of the first layer, or may be disposed to correspond to edges of the first layer 310 with edges of the adhesive layer 381.

According to an embodiment, the first layer 310, which has rigidity, may enable the flexible display 260 to attain rigidity. According to an embodiment, as the flexible display 260 attains the rigidity by virtue of the first layer 310, the first layer 310 may have a greater area than an active area for receiving a user input on the display 260. According to an embodiment, in order for the display 260 to remain lightweight, the first layer 310 may be formed with a lightweight material. According to an embodiment, the first layer 310 may include a dielectric having permittivity over a designated value. For example, the first layer 310 may be formed with, but not limited to, a carbon reinforced fiber plastic (CRFP) having the permittivity of 200.

According to an embodiment, the first layer 310 may include a lattice pattern 370 in at least some area thereof. For example, the first layer 310 may include the lattice pattern 370 in an adjacent area to a folding axis (e.g., the folding axis A of FIG. 2A). According to an embodiment, as the first layer 310 includes the lattice pattern 370 in the adjacent area of the folding axis, if the electronic device 101 is switched to the folded state (e.g., FIG. 2B) or the unfolded state (e.g., FIG. 2A), the first layer 310 and the plurality of the layers bonded with the first layer 310 may also folded or unfolded according to each state.

According to an embodiment, a part of the edges of the first layer 310 may be formed inwardly as compared to the edges of the display panel 330 or the second layer 320, when viewed from a direction perpendicular to the front surface of the electronic device 101. According to an embodiment, another part of the edges of the first layer 310 may be formed outwardly as compared to the edges of the display panel 330 or the second layer 320, when viewed from the direction perpendicular to the front surface of the electronic device 101. Its detailed description shall be explained.

According to an embodiment, the display 260 may further include a thermoplastic member 390 (e.g., a thermoplastic poly urethane (TPU)) disposed below the first layer 310. According to an embodiment, the display 260, including the thermoplastic member 390, may prevent damages to the display panel 330, the first layer 310 and/or the second layer 320. For example, the display 260, which includes the thermoplastic member 390, may prevent bubbles occurring between the plurality of the layers disposed in the display 260. In addition, the display 260, including the thermoplastic member 390, may prevent foreign substances from entering the plurality of the layers disposed in the display 260.

According to an embodiment, the display 260 may include the second layer 320 disposed below the first layer 310. According to an embodiment, the second layer 320 may include at least one of a digitizer 321 and a metal plate 322. For example, the second layer 320 may include the metal plate 322 disposed below the first layer 310.

According to an embodiment, the digitizer 321 and the metal plate 322 may be bonded by an adhesive. For example, the adhesive may be applied to a bottom of the digitizer 321, and the metal plate 322 may be bonded below the digitizer 321 by the adhesive.

According to an embodiment, the second layer 320 may be discontinued and formed in an area corresponding to the folding axis (e.g., the folding axis A of FIG. 2A). According to an embodiment, as the second layer 320 is discontinued and formed in the area corresponding to the folding axis (e.g., the folding axis A of FIG. 2A), if the electronic device 101 is switched to the folded state (e.g., FIG. 2B) or the unfolded state (e.g., FIG. 2A), the second layer 320 may be folded or unfolded according to each state.

According to another embodiment (not shown), the second layer 320 may have flexibility, and may be formed by crossing the folding axis.

According to another embodiment (not shown), the second layer 320 may be disposed at the position of the cover panel 331 in place of the cover panel 331, without being disconnected. The second layer 320 according to an embodiment, which is disposed at the position of the cover panel 331 without being disconnected, may prevent degradation of a function for detecting a touch input due to the disconnection.

According to an embodiment, the digitizer 321 is a device for detecting an input to a position x and/or a position y, and may detect an input device (e.g., an electronic pen) of a magnetic field type. For example, at least one processor (e.g., the processor 120 of FIG. 1) may provide an electric current to the digitizer 321, and the digitizer 321 may generate an electromagnetic field. If the electronic pen approaches the electromagnetic field of the digitizer 321, electromagnetic induction may occur and a resonance circuit of the electronic pen may generate the electric current. The resonance circuit of the electronic pen may generate a magnetic field using the generated current. At least one processor may detect a position by scanning intensity of the magnetic field applied from the electronic pen to the digitizer 321 over the entire area. At least one processor may perform an operation based on the detected position.

According to an embodiment, the metal plate 322 may be referred to as a shielding layer. According to an embodiment, the metal plate 322 may spread a magnetic metal powder (MMP) to the bottom of the digitizer 321. According to an embodiment, the metal plate 322 may reduce noise by shielding magnetic force due to peripheral electronic components except for the signal inputted from the electronic pen.

Figure 4:
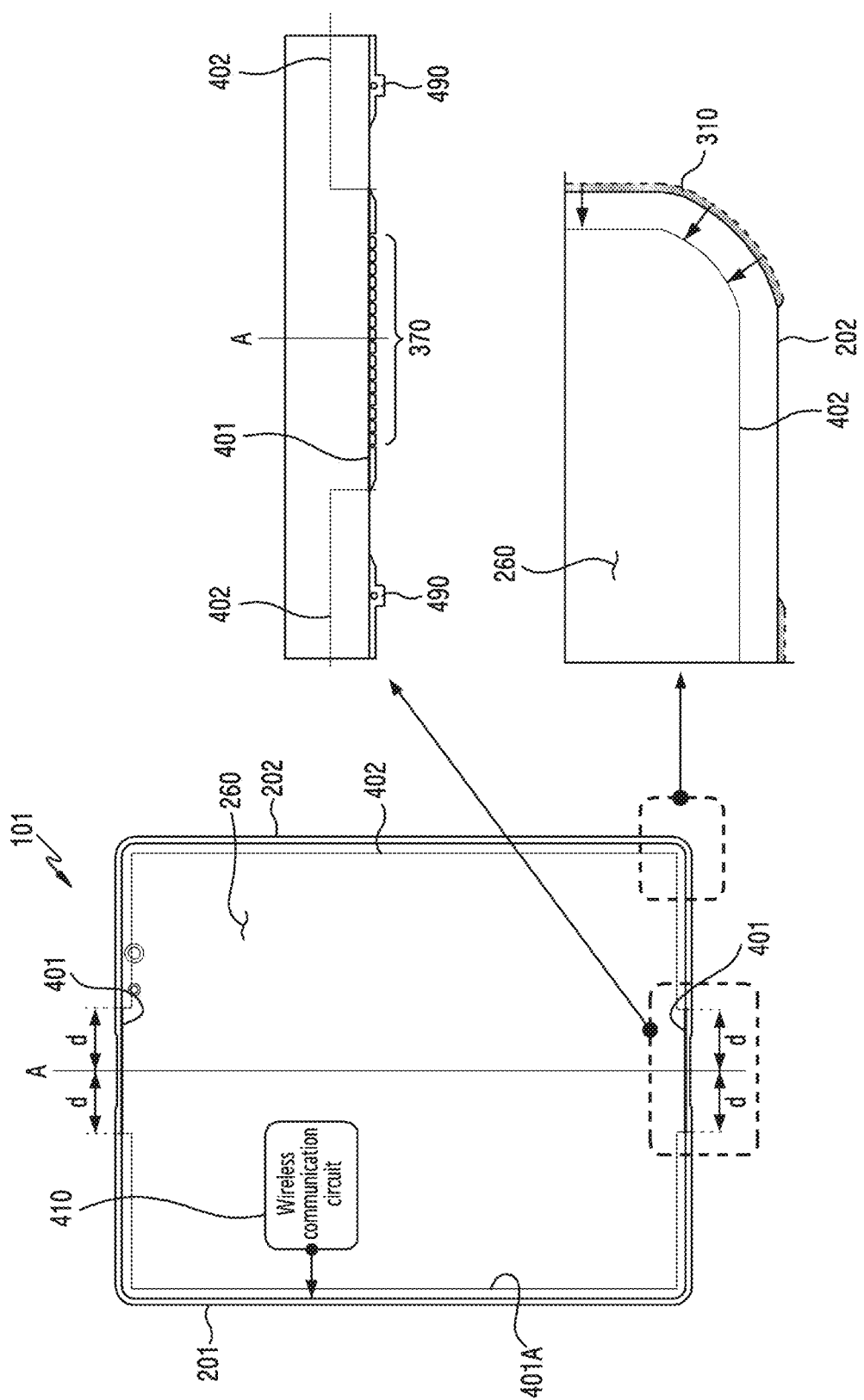
FIG. 4 illustrates edges of a first layer scaled down by a specific distance from a side surface of an electronic device according to an embodiment.

FIG. 4 illustrate edges of a first layer scaled down by a specific distance from a side surface of an electronic device according to an embodiment.

Referring to FIG. 4, an electronic device 101 according to an embodiment may include a first layer (e.g., the first layer 310 of FIG. 3) having edges 401 and 402 formed inside edges of a housing 200 and a wireless communication circuit 410 disposed inside the housing 200. According to an embodiment, at least a part of the edges of the first layer may be spaced and formed inwardly from a side surface of the electronic device 101 by a specific distance (e.g., about 1 mm).

According to an embodiment, the wireless communication circuit 410 may be electrically connected with at least a part of the housing 200. According to an embodiment, the wireless communication circuit 410 may transmit and receive signals of a designated frequency band by supplying power to at least some area of the housing 200. For example, the wireless communication circuit 410 may transmit and receive signals of a 6 GHz frequency band by supplying the power to some area of the first housing 201.

According to an embodiment, the first layer 310 may include the edges 401 and 402 formed inwardly from the side surface of the electronic device 101 formed by the housing 200. According to an embodiment, the first layer 310 may include the first edge 401 spaced inwardly from the side surface formed by a first housing 201 (or the first side member 2011 of FIG. 2B) or a second housing 202 (or the second side member 2021 of FIG. 2B) by a specific distance (e.g., 0.5 mm). According to an embodiment, the first layer 310 may include the second edge 402 spaced inwardly from the side surface formed by the first housing 201 or the second housing 202 by a specific distance (e.g., 1 mm).

According to an embodiment, the first edge 401 and the second edge 402 may be formed to correspond to the edges of the electronic device 101 formed by the housing 200. Its detailed description shall be explained below.

According to an embodiment, the first edge 401 may be formed within a designated distance d (e.g., 5.5 mm) from a folding axis A. According to an embodiment, the second edge 402 may be formed apart from the folding axis A over a designated distance d (e.g., 5.5 mm).

According to an embodiment, the first layer 310 may include a lattice pattern 370 in at least some area. According to an embodiment, the first layer 310 may include a lattice pattern 370 in at least some area adjacent to the folding axis A. According to an embodiment, the first edge 401 of the first layer 310 may be formed in an area corresponding to an area including the lattice pattern 370.

According to an embodiment, the lattice pattern 370 may include a plurality of bars. According to an embodiment, the first layer 310, which includes the lattice pattern 370 including the plurality of the bars in at least some area, may be folded or unfolded about the folding axis A.

According to an embodiment, the display 260 may include an align mark 490 extending from a second layer (e.g., the second layer 320 of FIG. 3). According to an embodiment, the align mark 490 extending from the second layer may be formed at a corresponding position about the folding axis A.

Figure 5:
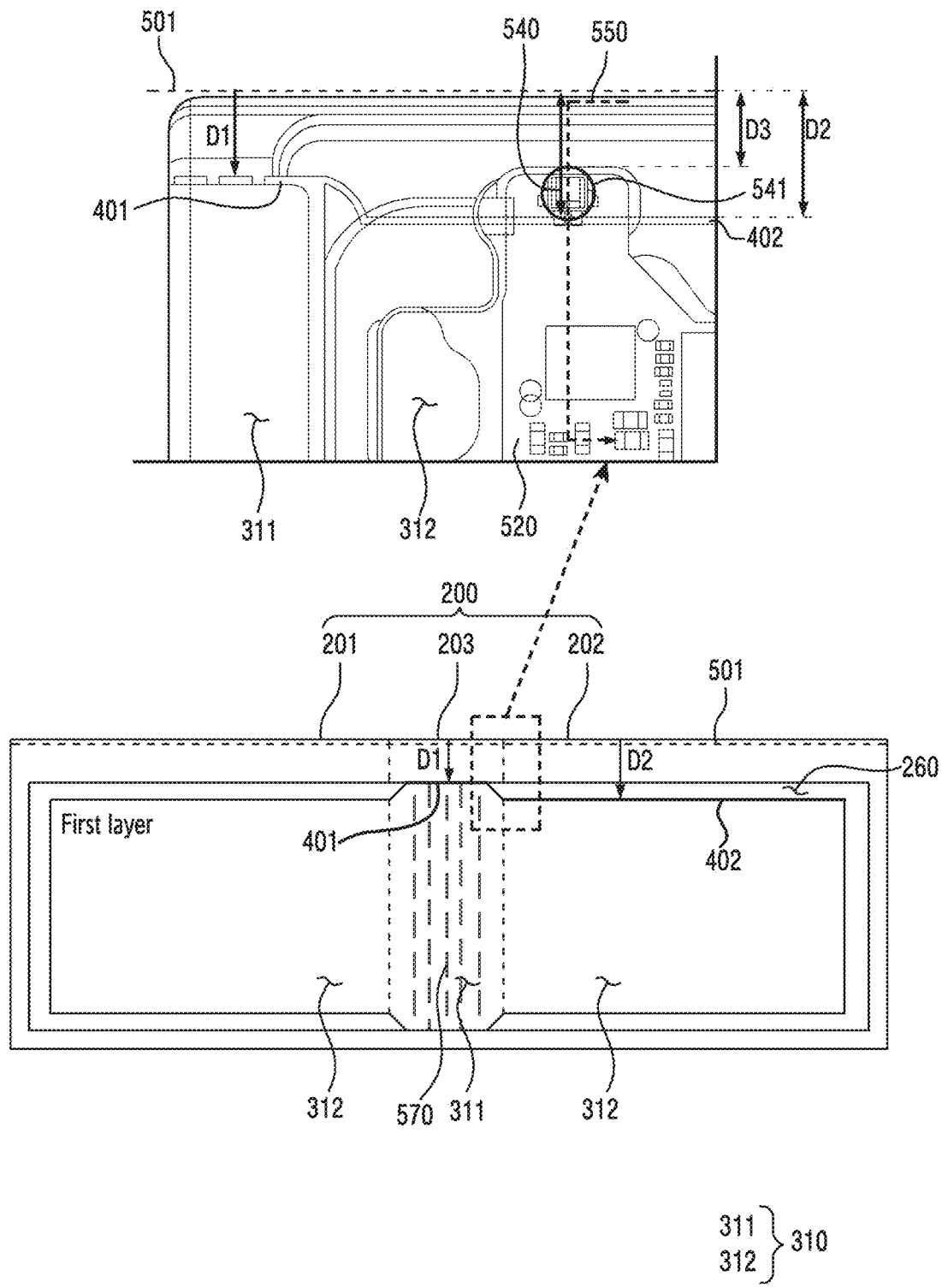
FIG. 5 illustrates a display structure and an enlarged view of an electronic device according to an embodiment.

FIG. 5 illustrates a display structure and an enlarged view of an electronic device according to an embodiment.

Referring to FIG. 5, a display 260 (or a display structure) according to an embodiment may include a first layer 310 having edges of different spacing distances from a first side surface 501 according to an area. According to an embodiment, the first layer 310 may include a dielectric having permittivity over designated permittivity. For example, the first layer 310 may be formed with, but not limited to, a CFRP.

According to an embodiment, the first layer 310 may include a first area 311 corresponding to a connection portion 203 (or a hinge structure) of a housing 200 and a second area 312 excluding or outside of the first area 311. According to an embodiment, the first layer 310 may include a first area 311 adjacent to a connection portion 203 and including a lattice pattern 570 and a second area 312 excluding or outside of the first area 311. According to an embodiment, the first layer 310 may include a first area 311 corresponding to a connection portion 203 (or a hinge structure) of a housing 200 and a second area 312 corresponding to a first housing 201 and a second housing 202.

According to an embodiment, a second edge 402 of the second area 312 may be spaced farther from a first side surface 501 of the electronic device 101 formed by the housing 200 than a first edge 401 of the first area 311. According to an embodiment, the first edge 401 of the first area 311 may be spaced away from the first side surface 501 formed by the housing 200 by a first distance D1. According to an embodiment, the second edge 402 of the second area 312 may be spaced away from the first side surface 501 formed by the housing 200 by a second distance D2 which is greater than the first distance D1.

According to an embodiment, the electronic device 101 may include a printed circuit board 520 disposed inside the housing 200. According to an embodiment, the electronic device 101 may include a wireless communication circuit (e.g., the wireless communication module 192 of FIG. 1) electrically connected with the printed circuit board 520. According to an embodiment, the wireless communication module may transmit and receive signals of a designated frequency band by supplying power to at least a part of the housing 200.

According to an embodiment, at least a part of the housing 200 may be electrically connected with a first point 541 of the printed circuit board 520 spaced away from the first side surface 501 by a third distance D3 which is smaller than the second distance D2. According to an embodiment, at least a part of the housing 200 may be electrically connected with a conductive connection member 540 of the printed circuit board 520 disposed at the first point 541 of the printed circuit board 520 spaced away from the first side surface 501 by the third distance D3 which is smaller than the second distance D2. For example, the conductive connection member 540 may include, but not limited to, a C-clip.

According to an embodiment, at least some area overlapping an active area where a user's touch input to the display 260 is detected in the first layer 310 may include the first edge 401 spaced away from the first side surface 501 by a first distance D1. According to an embodiment, at least some area overlapping an inactive area where a user's touch input to the display 260 is not detected in the first layer 310 may include the second edge 402 spaced away from the first side surface 501 by a second distance D2 which is greater than the first distance D1

According to an embodiment, the first point 541 connected with the conductive connection member 540 of the printed circuit board 520 may not overlap with the second area 312 of the first layer 310. According to an embodiment, the first point 541 connected with the conductive connection member 540 of the printed circuit board 520 and/or at least a part of the conductive connection member 540 may be spaced and disposed away or separated at a distance from the second edge 402 of the second area 312 without overlapping with the second area 312 of the first layer 310.

According to an embodiment, at least a part of the housing 200 may be electrically connected with the ground through the first point 541 of the printed circuit board 520 spaced away from the first side surface 501 by a third distance D2 which is greater than the first distance D1 and smaller than the second distance D2. According to an embodiment, at least a part of the housing 200 may be electrically connected with the ground through the conductive connection member 540 disposed at the first point 541 connected with the conductive connection member 540 of the printed circuit board 520 spaced away from the first side surface 501 by the third distance D2 which is greater than the first distance D1 and smaller than the second distance D2.

According to an embodiment, at least a part of the housing 200 may be electrically connected with a second point (not shown) of the printed circuit board 520 spaced away from the first side surface 501 by the third distance D2 which is greater than the first distance D1 and smaller than the second distance D2. According to an embodiment, the wireless communication circuit may supply the power to at least a part of the housing 200 through the second point.

According to an embodiment, the wireless communication circuit may supply the power to a first electrical path 550 including at least a part of the housing 200, the conductive connection member 540 and the ground and thus transmit and/or receive signals of a designated frequency band. According to another embodiment, the wireless communication circuit may transmit and/or receive signals of a designated frequency band by supplying the power to a first electrical path 550 including the second point, at least a part of the housing 200, the conductive connection member 540 and the ground. According to an embodiment, the wireless communication circuit may transmit and/or receive signals of a designated frequency band through the first electrical path 550 including the conductive connection member 540 and the ground by supplying the power to at least a part of the housing 200. For example, the signals of the designated frequency band may include, but not limited to, signals of a frequency band of 1500 MHz through 2200 MHz.

Figure 6A:
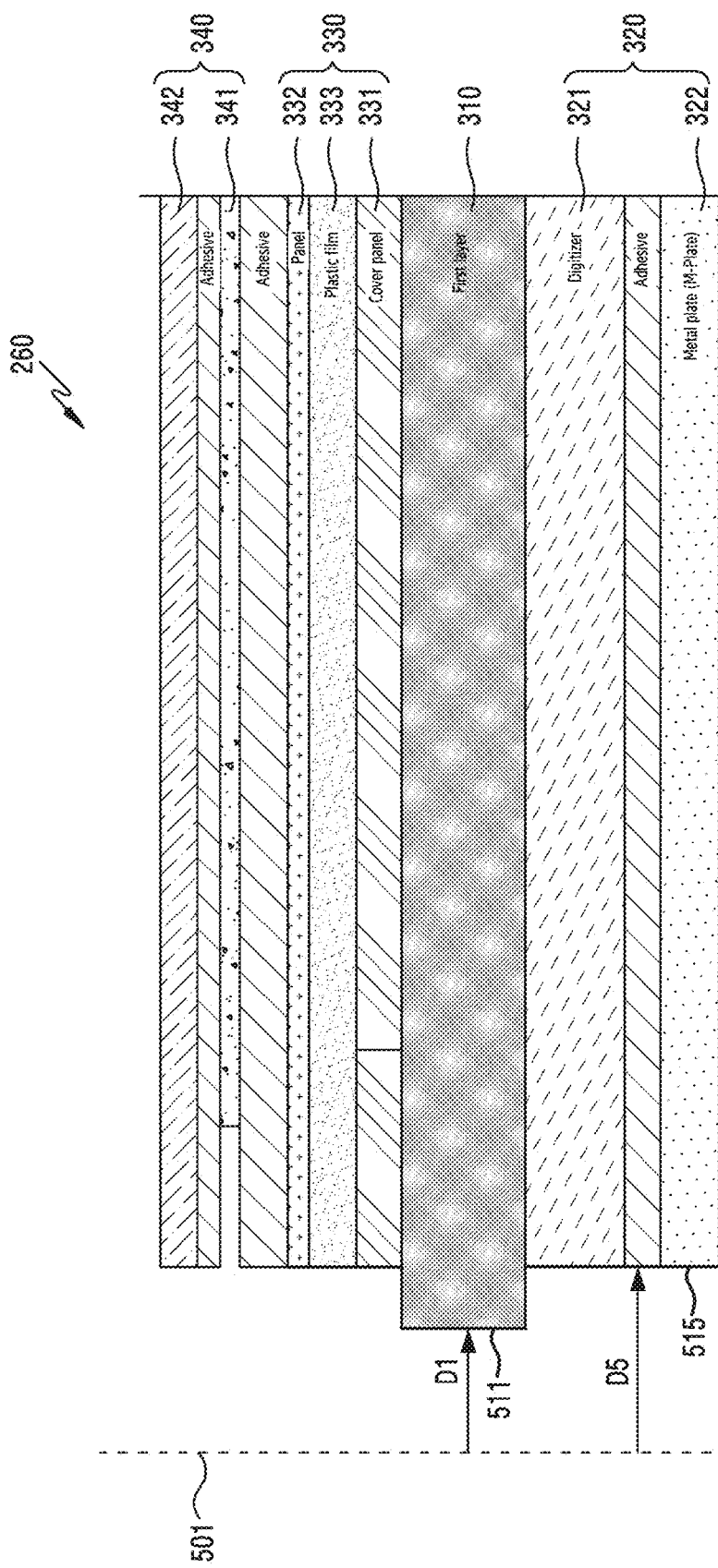
FIG. 6A is a side view of an area corresponding to a first area of a first layer in a display structure according to an embodiment.
Figure 6B:
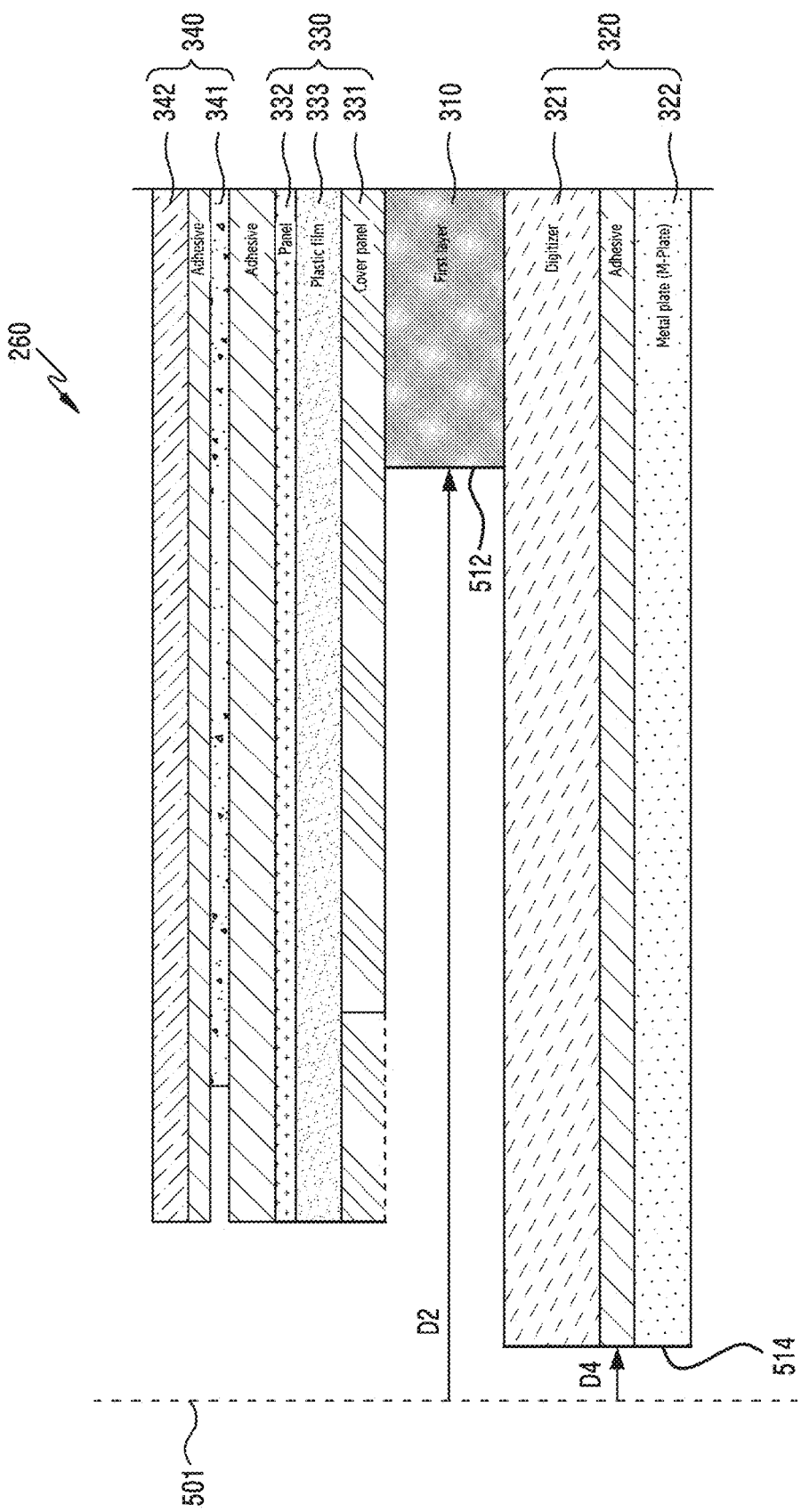
FIG. 6B is a side view of an area corresponding to a second area of a first layer in a display structure according to an embodiment.

FIG. 6A is a side view of an area corresponding to a first area of a first layer in a display structure according to an embodiment. FIG. 6B is a side view of an area corresponding to a second area of the first layer in the display structure according to an embodiment.

Referring to FIG. 6A and FIG. 6B together, a display 260 according to an embodiment may include a plurality of layers, and the plurality of the layers may be spaced and displayed away from a first side surface 501 (e.g., the side surface of the electronic device 101 of FIG. 2A) of an electronic device 101 by specific distances respectively. According to an embodiment, the first side surface 501 may be referred to as the side surface of the electronic device 101 formed by a first housing (e.g., the first housing 201 of FIG. 2A).

According to an embodiment, the display 260 may include a cover glass 340 which forms at least a one of a front surface of the electronic device, a display panel 330 disposed adjacent to one surface of the cover glass 340, a first layer 310 disposed below the display panel 330 and a second layer 320 disposed below the first layer 310. The same or substantially the same configuration as the aforementioned configuration uses the same reference numeral, and its redundant explanation shall be omitted.

Referring to FIG. 6A, the first area (e.g., the first area 311 of FIG. 5) of the first layer 310 according to an embodiment may include a first edge 511 (e.g., the first edge 401 of FIG. 4) spaced away from a first side surface 501 by a first distance D1. For example, the first edge 511 of the first area 311 of the first layer 310 may be spaced away from the first side surface 501 by about 0.5 mm According to an embodiment, at least some area of the first layer 310 may include a lattice pattern 570, and the display 260 may be folded at a designated angle through the lattice pattern 570 as the electronic device 101 is switched to the unfolded state (e.g., the flat state of FIG. 2A) and the folded state (e.g., the folded state of FIG. 2B).

According to an embodiment, an area corresponding to the first area 311 of the first layer 310 in the second layer 320 may include a fifth edge 515 spaced away from the first side surface 501 by a fifth distance D5 which is greater than the first distance D1. For example, the fifth edge 515 of the second layer 320 may be spaced away from the first side surface 501 by, but not limited to, a specific distance (e.g., about 0.7 mm).

Referring to FIG. 6B, a second area (e.g., the second area 312 of FIG. 5) of the first layer 310 according to an embodiment may include a second edge 512 (e.g., the second edge 402 of FIG. 4) spaced from the first side surface 501 by a second distance D2 which is greater than the first distance D1. For example, the second edge 512 of the second area 312 of the first layer 310 may be spaced away from the first side surface 501 by about 1 mm.

According to an embodiment, an area corresponding to the second area 312 of the first layer 310 in the second layer 320 may include a fourth edge 514 spaced away from the first side surface 501 by a fourth distance D4 which is smaller than the second distance D2. For example, the fourth edge 514 of the second area 312 may be spaced away from the first side surface 501 by, but not limited to, a specific distance (e.g., about 0.2 mm).

According to an embodiment, as the second edge 512 is spaced from the first side surface 501 by the second distance D2, it may be spaced away from at least a part of a first housing 201 over a specific distance. According to an embodiment, as the first edge 511 is spaced away from the first side surface 501 by the first distance D1, it may be spaced away from at least a part of the first housing 201 over a specific distance.

According to an embodiment, at least a part of the first edge 511 of the first layer 310 may be formed on an outer side of edges of the display panel 330.

According to an embodiment, the second edge 512 of the first layer 310 may be formed on an inner side of the edges of the display panel 330. According to an embodiment, the second edge 512 of the first layer 310 may form an innermost edge of the display 260.

According to an embodiment, at least a part of the fourth edge 514 of the second layer 320 may be formed on an outer side of the edges of the display panel 330.

According to an embodiment, a wireless communication circuit (e.g., the wireless communication circuit 410 of FIG. 4) may transmit and/or receive signals of a designated frequency band by supplying power to one point of the first housing 201.

According to an embodiment, the second edge 512 of the first layer 310 may be formed in an area corresponding to the power supply area from the wireless communication circuit in the first housing 201.

According to an embodiment, the second edge 512 of the first layer 310 may be spaced and formed away or separated at a distance from the power supply area from the wireless communication circuit in the first housing 201 by the second distance D2 which is greater than the first distance D1. According to an embodiment, the second edge 512 is spaced and formed away or separated at a distance from the power supply area from the wireless communication circuit 410 in the first housing 201 over a specific distance (e.g., 1 mm). This may improve radiation performance of the signals transmitted and received through the first housing 201. For example, the second edge 512 of the first layer 310 having permittivity over 150 is spaced and formed away or separated at a distance from the power supply area from the wireless communication circuit 410 in the first housing 201 over about 1 mm, and thus may improve the radiation performance degradation of the signals transmitted and received through the first housing 201.

According to an embodiment, the second edge 512 of the first layer 310 may be spaced and formed away or separated at a distance from an area connected to the ground in the first housing 201 by the second distance D2. According to an embodiment, the second edge 512 is spaced and formed away or separated at a distance from the ground connected area in the first housing 201 over a specific distance (e.g., 1 mm). This may improve the radiation performance of the signals transmitted and received through the first housing 201. For example, as the second edge 512 of the first layer 310 having the permittivity over 150 is spaced and formed away or separated at a distance from the ground connected area in the first housing 201 over about 1 mm, and thus may improve the radiation performance degradation of the signals transmitted and received through the first housing 201.

According to an embodiment, at least a part of the first housing 201 may be connected to the ground in an area corresponding to the area where the second edge 512 of the first layer 310 is spaced and formed away or separated at a distance from the first side surface 501 by the second distance D2. According to an embodiment, at least a part of the first housing 201 may be connected to the ground in the area corresponding to the area where the second edge 512 of the first layer 310 is spaced and formed away or separated at a distance from the first side surface 501 by the second distance D2 through a first point (e.g., the first point 541 of FIG. 5) spaced by a third distance D3 which is smaller than the second distance D2. According to an embodiment, at least a part of the first housing 201 may be connected to the ground in the area corresponding to the area where the second edge 512 of the first layer 310 is spaced and formed away or separated at a distance from the first side surface 501 by the second distance D2 through a conductive connection member (e.g., the conductive connection member 540 of FIG. 5) (e.g., a C-clip).

According to another embodiment (not shown), the first housing 201 and the first side surface 501 of FIG. 6A and FIG. 6B may be referred to as a second housing 202 corresponding to the first housing 201 and a second side surface formed by the second housing 202 respectively.

Figure 7A:
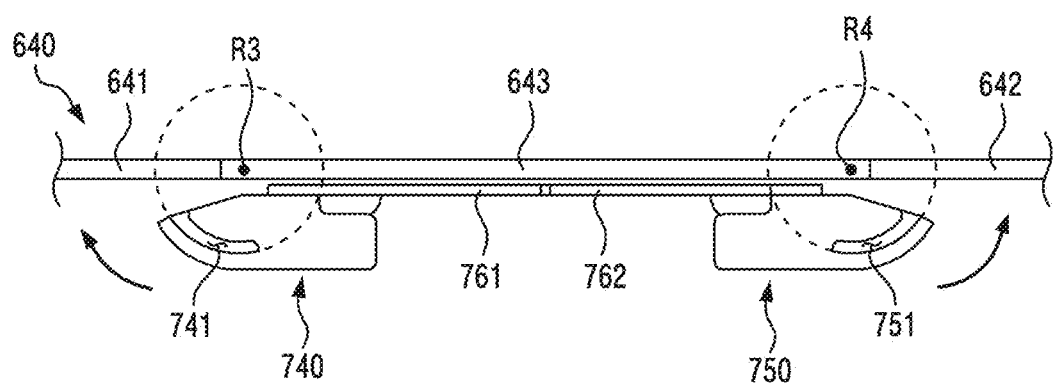
FIG. 7A illustrates a structure in which a display including a rotation plate and a guide member is unfolded.
Figure 7B:
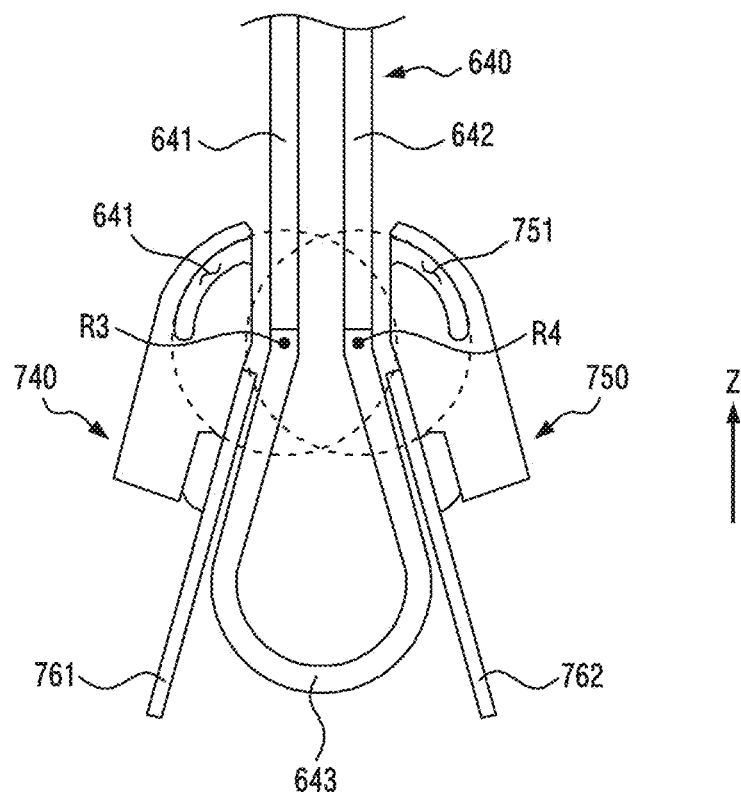
FIG. 7B illustrates a structure in which a display including a rotation plate and a guide member is folded.

FIG. 7A illustrates a structure in which a display including a rotation plate and a guide member is unfolded. FIG. 7B illustrates the structure in which the display including the rotation plate and the guide member is folded.

Referring to FIG. 7A and FIG. 7B together, a hinge structure according to an embodiment may include a first guide member 740, a second guide member 750, a first guide groove 741, a second guide groove 751, a first rotation plate 761 and a second rotation plate 762.

In an embodiment, it may be configured to rotate on a third rotation axis R3 by a repulsive force of the first guide member 740 and the first rotation plate 761. In an embodiment, the second guide member 750 and the second rotation plate 761 may be configured to rotate on a fourth rotation axis R4 by a repulsive force of a display 640 (e.g., the display 260 of FIG. 3).

According to an embodiment, the first rotation plate 761 and the first guide member 740 may rotate in a first rotation direction (e.g., clockwise) on the third rotation axis R3 by the repulsive force of the display 640 in the folding operation. The first rotation plate 761 may be coupled to integrally move with the first guide member 741, and the first guide member 740 may rotate on the third rotation axis R3 along a designated path with respect to the first rotation member 220 by the repulsive force transferred to the first rotation plate 761.

In an embodiment, the third rotation axis R3 and/or the rotation path of the first guide member 740 may be formed by the first guide groove 741 of the first guide member 740. In an embodiment, a center of a circular arch of the first guide groove 741 may form the third rotation axis R3 of the first guide member 740.

In an embodiment, the third rotation axis R3 may be positioned on the display 640. For example, the third rotation axis R3 may be positioned in at least some area of the display 640, when viewed from the axial direction of the electronic device 101. For example, the third rotation axis R3 may be positioned between both surfaces in a longitudinal direction of the display 640. Based on FIG. 7A and FIG. 7B, the third rotation axis R3 may be positioned between a first surface (e.g., a front surface or an upper surface) and a second surface (e.g., a rear surface or a lower surface) of the display 640. For example, the third rotation axis R3 may pass or penetrate at least a part of the display 640 in the axial direction. For example, the third rotation axis R3 may overlap with the display 640, in the cross sectional view of the display 640. For example, in the unfolded state, the third rotation axis R3 may be positioned in the +z direction based on the first rotation plate 761.

According to an embodiment, the second rotation plate 762 and the second guide member 750 may rotate in a second rotation direction on the fourth rotation axis R4 by the repulsive force of the display 640 in the folding operation. For example, as the folding area 643 is folded in the folding operation, the repulsive force generating from the folding area 643 may be transferred to the second rotation plate 762. The second rotation plate 762 may be coupled to integrally move with the second guide member 750, and the second guide member 750 may rotate on the fourth rotation axis R4 in the second rotation direction (e.g., counterclockwise) with respect to the second rotation member 730 by the repulsive force transferred to the second rotation plate 762.

In an embodiment, the fourth rotation axis R4 and/or the rotation path of the second guide member 750 may be formed by the second guide groove 751 of the second guide member 750. In an embodiment, the second guide groove 751 may be formed substantially in a circular arch shape. A center of the circular arch of the second guide groove 751 may form the fourth rotation axis R4 of the second guide member 750.

In an embodiment, the fourth rotation axis R4 may be positioned on the display 640. For example, the fourth rotation axis R4 may be positioned in at least some area of the display 640, when the electronic device 101 is viewed from the axial direction. For example, the fourth rotation axis R4 may be positioned between both surfaces in the longitudinal direction of the display 640. Based on FIG. 7A and FIG. 7B, the fourth rotation axis R4 may be positioned between the first surface (e.g., the front surface or the upper surface) and the second surface (e.g., the rear surface or the lower surface) of the display 640. For example, the fourth rotation axis R4 may pass or penetrate at least a part of the display 640 in the axial direction. For example, the fourth rotation axis R4 may overlap with the display 640, in the cross sectional view of the display 640. For example, in the unfolded state, the fourth rotation axis R4 may be positioned in the +z direction based on the second rotation plate 762.

In an embodiment, if the folding and unfolding operations are performed, the rotation direction of the first rotation member 720 and the rotation direction of the second rotation member 730 may be opposite to each other. In addition, if the folding and unfolding operations are conducted, the rotation direction of the first guide member 740 and the first rotation plate 761 and the rotation direction of the second guide member 750 and the second rotation late 762 may be opposite to each other.

Figure 8A:
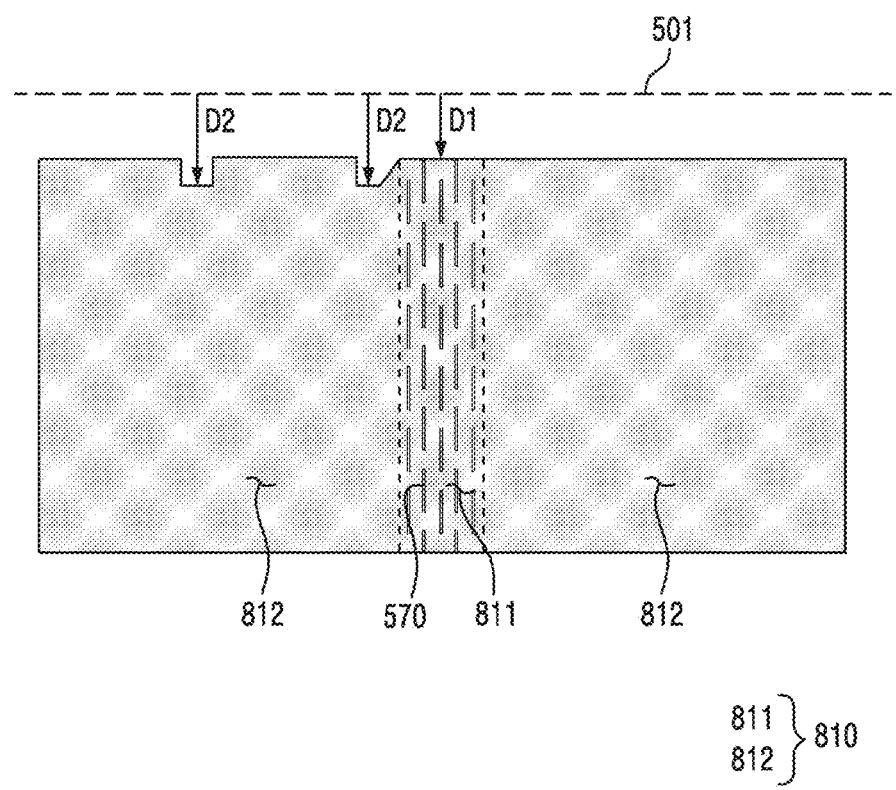
FIG. 8A is a plan view of a first layer according to an embodiment.
Figure 8B:
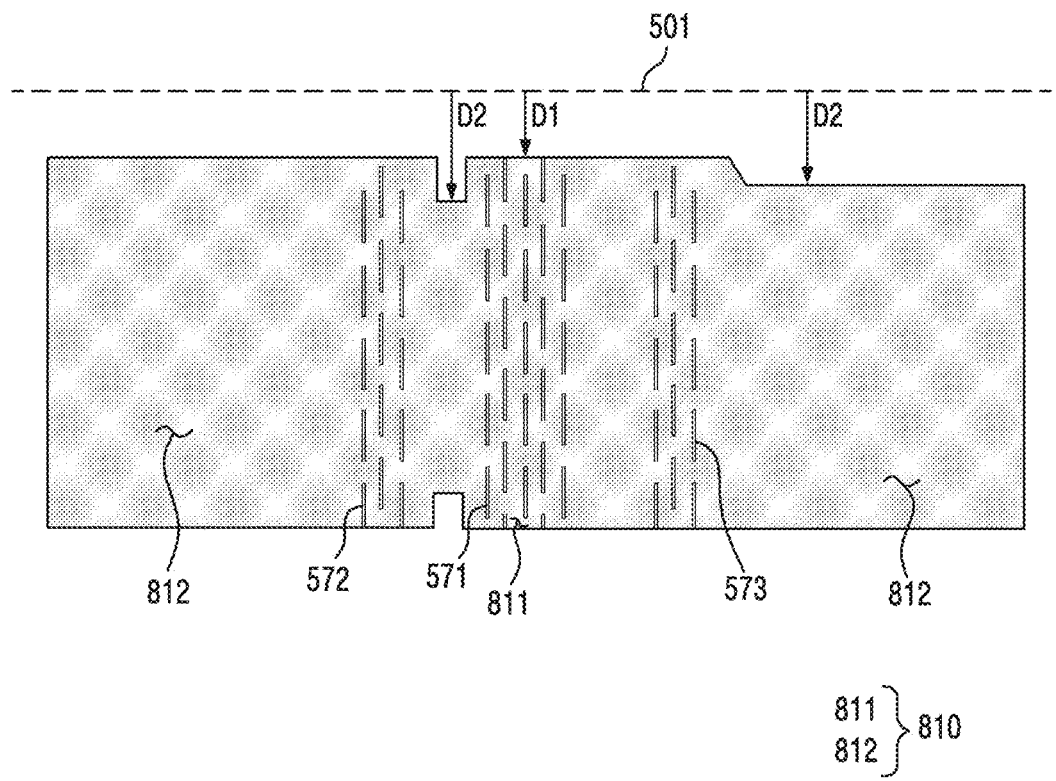
FIG. 8B is a plan view of a first layer according to another embodiment.
Figure 8C:
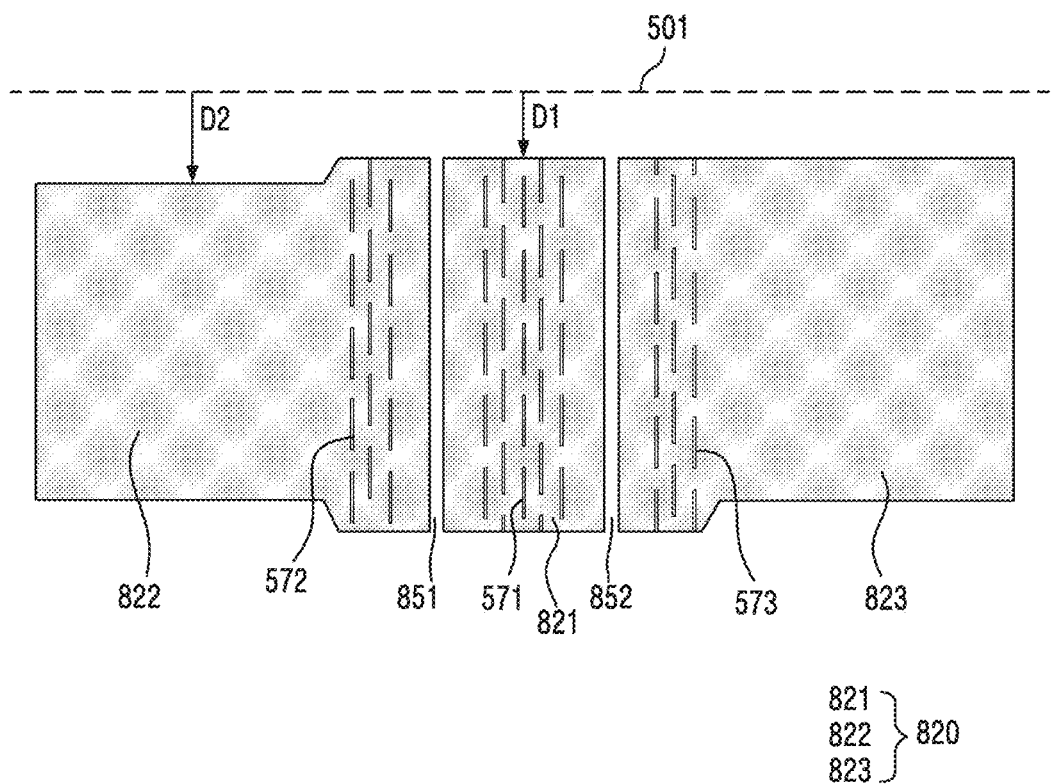
FIG. 8C is a plan view of a first layer including a plurality of portions according to an embodiment.
Figure 8D:
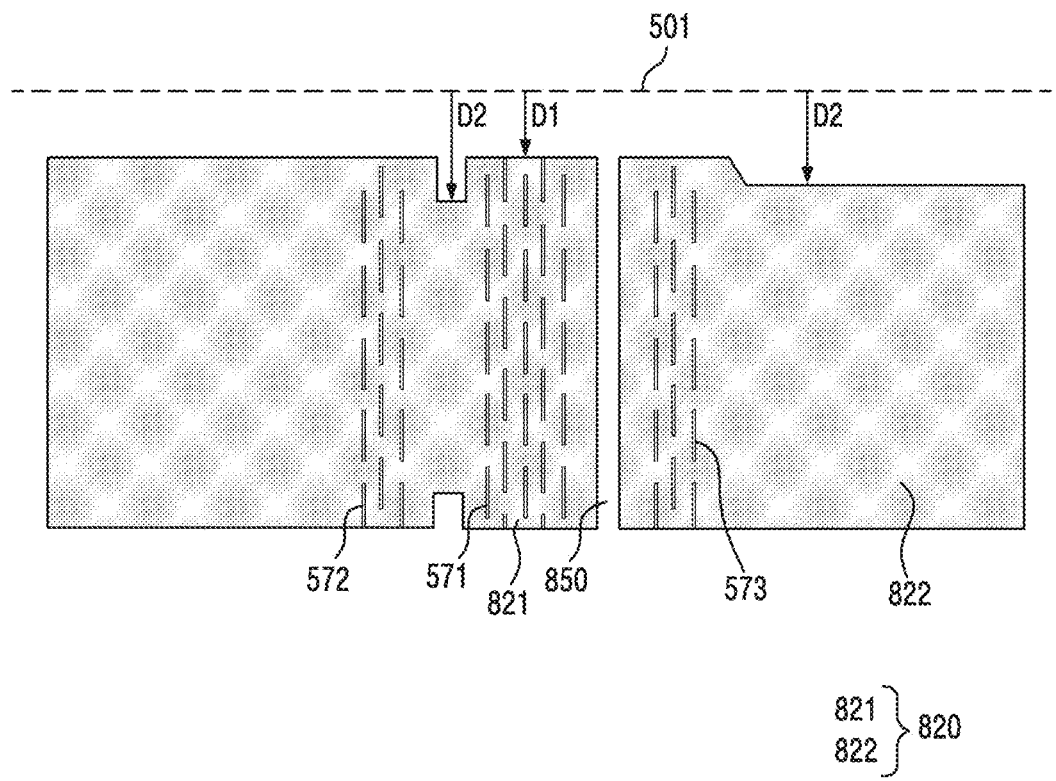
FIG. 8D is a plan view of a first layer including a plurality of portions according to another embodiment.

FIG. 8A is a plan view of a first layer according to an embodiment. FIG. 8B is a plan view of the first layer according to another embodiment. FIG. 8C is a plan view of the first layer including a plurality of portions according to an embodiment. FIG. 8D is a plan view of the first layer including the plurality of the portions according to another embodiment.

Referring to FIG. 8A through FIG. 8D, a first layer 810 or 820 according to an embodiment may include edges spaced from a first side surface 501 by various distances depending on their area (or, portion). According to an embodiment, the first layer 810 may include an edge (e.g., the second edge 402 of FIG. 4) spaced away from a first side surface 501 over a specific distance in an area corresponding to a point where at least a part of a side member (e.g., the first side member 2011 of FIG. 2A) is connected to the ground and/or a printed circuit board (e.g., the printed circuit board 520 of FIG. 5). The configuration identical or substantially identical to the aforementioned configuration uses the identical reference number, and its redundant explanation shall be omitted.

Referring to FIG. 7A, FIG. 7B and FIG. 8A through FIG. 8D together, if the electronic device 101 according to an embodiment is switched from the unfolded state (e.g., the flat state of FIG. 2A) to the folded state (e.g., the folded state of FIG. 2B), a folding area 263 may be folded through a first lattice pattern 751 formed adjacent to the folding area 263.

In an embodiment, if the electronic device 101 is switched from the unfolded state to the folded state, at least a part of the area adjacent to the folding area 263 in the first area 261 and/or the second area 262 may be folded with specific curvature. For example, if the electronic device 101 is switched from the unfolded state to the folded state, the part of the area adjacent to the folding area 263 in the first area 261 and/or the second area 262 may be bent by rotating on a rotation axis spaced away from a folding axis (e.g., the folding axis A of FIG. 2A). For example, if the electronic device 101 is switched from the unfolded state to the folded state, the part of the area adjacent to the folding area 263 in the first area 261 and the second area 262 may be bent with specific curvature through a second lattice pattern 572 and a third lattice pattern 573 formed away or separated at a distance from the first lattice pattern 571.

According to an embodiment, if the electronic device 101 is switched from the unfolded state to the folded state, some area adjacent to the folding area 263 in the first area 261 may be bent with a specific curvature based on one axis by the repulsive force generating from the folding area 263. For example, the part of the area adjacent to the folding area 263 in the first area 261 may be bent with the specific curvature through the second lattice pattern 572 based on a first rotation axis. For example, the curvature of the part bending in the first area 261 may be smaller than the curvature of the folding area 263. For example, the part of the first area 261 may be bent by rotating in the opposite direction of the folding direction of the display 260 of the electronic device 101.

According to an embodiment, some area adjacent to the folding area 263 in the second area 262 may be bent with a specific curvature based on one axis by the repulsive force generating from the folding area 263. For example, the part of the area adjacent to the folding area 263 in the second area 262 may be bent with the specific curvature through the third lattice pattern 573 based on a second rotation axis corresponding to the first rotation axis. For example, the curvature of the part bending in the second area 262 may be smaller than the curvature of the folding area 263. For example, the part of the second area 262 may be bent by rotating in the opposite direction of the folding direction of the display 260 of the electronic device 101.

Referring to FIG. 8A, a first layer 810 according to an embodiment may include a first area 811 including a lattice pattern 570 and a second area 812 excluding or outside of the first area 811.

According to an embodiment, an edge (e.g., the first edge 401 of FIG. 5) of the first area 811 may be formed away for separated at a distance from a first side surface 501 by a first distance D1.

According to an embodiment, a part of an edge (e.g., the second edge 402 of FIG. 5) of the second area 812 may be formed away or separated at a distance from the first side surface 501 by a second distance D2 which is greater than the first distance D1. According to an embodiment, another part of the edge of the second area 812 may be formed away or separated at a distance from the first side surface 501 by the first distance D1.

According to an embodiment, as at least a part of the edge of the second area 812 is spaced away from the first side surface 501 by the second distance D2, radiation performance degradation may be prevented, in transmitting and/or receiving RF signals through a part of a side surface (e.g., the first side member 2011 of FIG. 2A) which forms the first side surface 501.

Referring to FIG. 8B, the first layer 810 according to an embodiment may include the first area 811 and the second area 812 which are separated from each other. According to an embodiment, the first area 811 of the first layer 810 may include a first lattice pattern 571 formed adjacent to a hinge (e.g., the connection portion 203 of FIG. 2A), a second lattice pattern 581 formed away or separated at a distance from the first lattice pattern 571 and a third lattice pattern 573 disposed at a position corresponding to the second lattice pattern 581 based on the first lattice pattern 571. According to an embodiment, the first layer 810 may include the second area 812 excluding or outside of the first area 811.

According to another embodiment, the first area 811 may include a first lattice pattern 571 formed adjacent to a hinge, and the second area 812 may include a second lattice pattern 581 formed away or separated at a distance from the first lattice pattern 571 and a third lattice pattern 573 disposed at a position corresponding to the second lattice pattern 581 based on the first lattice pattern 571.

According to an embodiment, at least a part of the edge (e.g., the first edge 401 of FIG. 5) of the first area 811 may be formed away or separated at a distance from the first side surface 501 by the first distance D1. According to an embodiment, another part of the edge of the first area 811 may be formed away or separated at a distance from the first side surface 501 by the second distance D2 which is greater than the first distance D1. For example, an edge of an area formed between the first lattice pattern 571 and the second lattice pattern 572 in the edge of the first area 811 may be formed away or separated at a distance from the first side surface 501 by the second distance D2 which is greater than the first distance D1.

According to an embodiment, a part of the edge (e.g., the second edge 402 of FIG. 5) of the second area 812 may be formed away or separated at a distance from the first side surface 501 by the second distance D2 which is greater than the first distance D1. According to an embodiment, as at least a part of the edge of the first area 811 and/or the second area 812 is spaced away from the first side surface 501 by the second distance D2 which is greater than the first distance D1, radiation performance degradation may be prevented, in transmitting and/or receiving RF signals through the part of the side surface (e.g., the first side member 2011 of FIG. 2A) which forms the first side surface 501.

Referring to FIG. 8C, the first layer 820 according to an embodiment may include a first portion 821, a second portion 822 and a third portion 823 which are separated from one another. According to an embodiment, the first portion 821 may include the first lattice pattern 571, the second portion 822 may include the second lattice pattern 572, and the third portion 823 may include the third lattice pattern 573. According to an embodiment, the first lattice pattern 571 included in the first portion 821 may be disposed in an area corresponding to the connection portion (e.g., the connection portion 203 of FIG. 2A or a hinge structure).

According to an embodiment, the second lattice pattern 572 and the third lattice pattern 573 may be disposed away or separated at a distance from the first lattice pattern 571.

According to an embodiment, the first portion 821 may be disposed between the second portion 822 and the third portion 823. According to an embodiment, the second portion 822 may be disposed adjacent to one end of the first portion 821, and the third portion 823 may be disposed adjacent to the other end of the first portion 821.

According to an embodiment, the first portion 821, the second portion 822 and the third portion 823 may be disposed away or separated at a distance from each other. For example, the second portion 822 may be disposed adjacent to the first portion 821 with a first gap 851 and the third portion 823 may be disposed adjacent to the first portion 821 with a second gap 851.

According to another embodiment, the first portion 821, the second portion 822 and the third portion 823 may be coupled together using nonconductive materials. For example, the first gap 851 and the second gap 852 may be filled with the nonconductive material (e.g., a plastic), and the first portion 821, the second portion 822 and the third portion 823 may be connected through the nonconductive material.

According to an embodiment, the first portion 821 and the second portion 822 may have a first permittivity, and the third portion 823 may have a second permittivity which is lower than the first permittivity. For example, the first portion 821 and the second portion 822 may have the permittivity of 200, and the third portion 823 may have the permittivity of 20. As another example, the first portion 821 may have a first permittivity, and the second portion 822 and the third portion 823 may have a second permittivity which is higher than the first permittivity. Notably, the permittivity of the first portion 821 through the third portion 823 is not limited the above examples, and the first portion 821 through the third portion 823 may each be formed with materials having various permittivities.

According to an embodiment, an edge (e.g., the first edge 401 of FIG. 5) of the first portion 821 may be formed away or separated at a distance from the first side surface 501 by the first distance D1.

According to an embodiment, a part of an edge (e.g., the second edge 402 of FIG. 5) of the second portion 822 may be formed away or separated at a distance from the first side surface 501 by the second distance D2 which is greater than the first distance D1. According to an embodiment, another part of the edge of the second portion 822 may be formed away or separated at a distance from the first side surface 501 by the first distance D1. According to an embodiment, as at least a part of the edge of the second portion 822 is spaced away from the first side surface 501 by the second distance D2, the radiation performance degradation may be prevented, in transmitting and/or receiving RF signals through a part of the side surface (e.g., the first side member 2011 of FIG. 2A) which forms the first side surface 501.

According to an embodiment, an edge of the third portion 823 having the second permittivity may be formed away or separated at a distance from the first side surface 501 by the first distance D1.

Referring to FIG. 8D, a first layer 820 according to an embodiment may include a first portion 821 and a second portion 822 which are separated. According to an embodiment, the first portion 821 of the first layer 820 may include a first lattice pattern 571 formed adjacent to the hinge (e.g., the connection portion 203 of FIG. 2A) and a second lattice pattern 572 formed away or separated at a distance from the first lattice pattern 571. According to an embodiment, the second portion 822 of the first layer 820 may include a third lattice pattern 573 formed at a position corresponding to the second lattice pattern 572 based on the first lattice pattern 571.

According to an embodiment, the first portion 821 may be disposed adjacent to the second portion 822. According to an embodiment, the first portion 821 and the second portion 822 may be disposed away or separated at a distance from each other. For example, the second portion 822 may be disposed adjacent to the first portion 821 with a gap 850.

According to another embodiment, the first portion 821 and the second portion 822 may be coupled through a nonconductive material. For example, the gap 850 may be filled with the nonconductive material (e.g., a plastic), and the first portion 821 and the second portion 822 may be connected through the nonconductive material.

According to an embodiment, at least a part of the edge (e.g., the first edge 401 of FIG. 5) of the first portion 821 may be formed away or separated at a distance from the first side surface 501 by the first distance D1. According to an embodiment, another part of the edge of the first portion 821 may be formed away or separated at a distance from the first side surface 501 by the second distance D2 greater than the first distance D1. For example, an edge of an area formed between the first lattice pattern 571 and the second lattice pattern 572 in the edge of the first portion 821 may be formed away or separated at a distance from the first side surface 501 by the second distance D2 which is greater than the first distance D1.

According to an embodiment, a part of the edge (e.g., the second edge 402 of FIG. 5) of the second portion 822 may be formed away or separated at a distance from the first side surface 501 by the second distance D2 which is greater than the first distance D1. According to an embodiment, as at least a part of the edge of the first portion 821 and/or the second portion 822 is spaced away from the first side surface 501 by the second distance D2, the radiation performance degradation may be prevented, in transmitting and/or receiving RF signals through the part of the side surface (e.g., the first side member 2011 of FIG. 2A) which forms the first side surface 501.

Figure 9A:
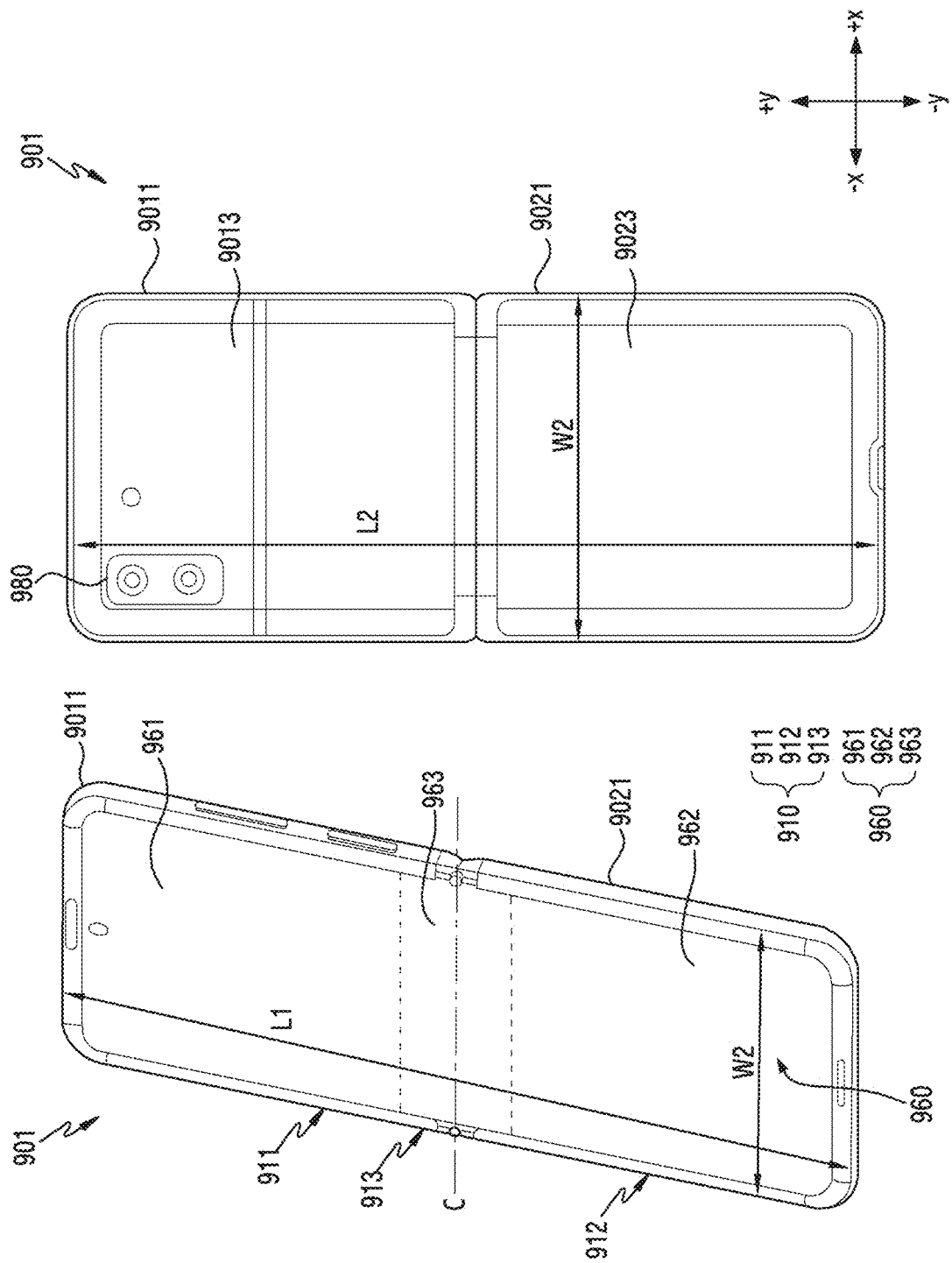
FIG. 9A illustrates an electronic device in an unfolded state, according to another embodiment.
Figure 9B:
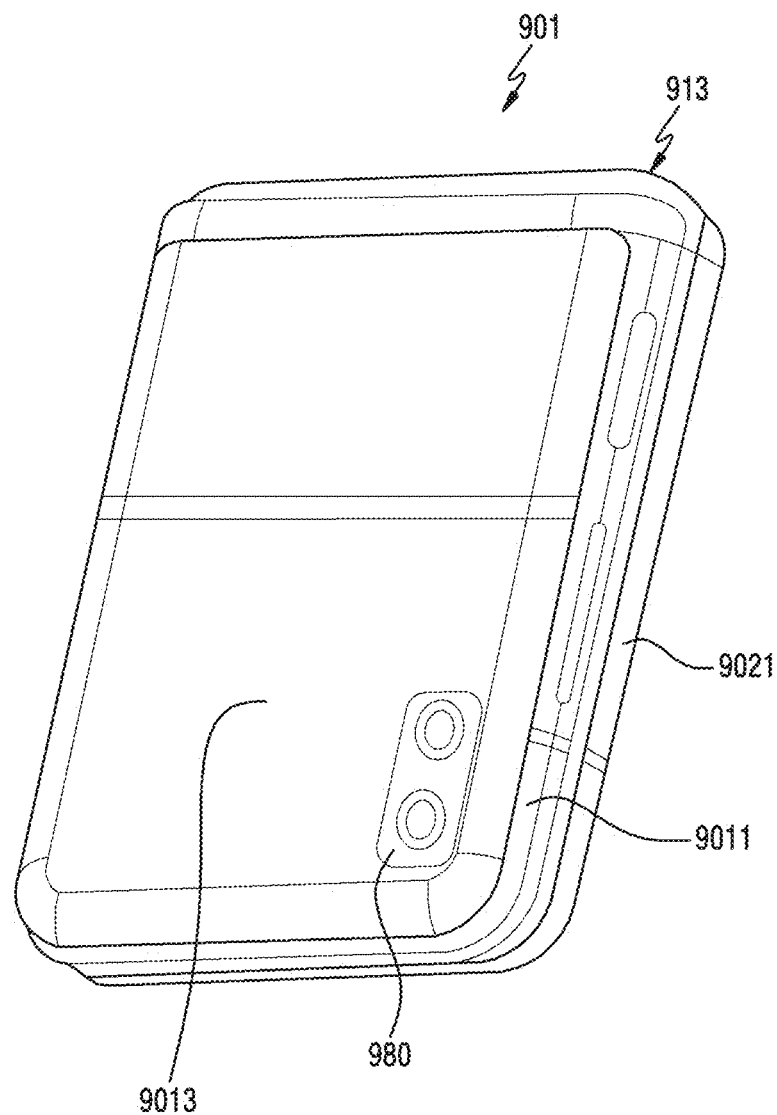
FIG. 9B illustrates an electronic device in a folded state, according to another embodiment.
Figure 9C:
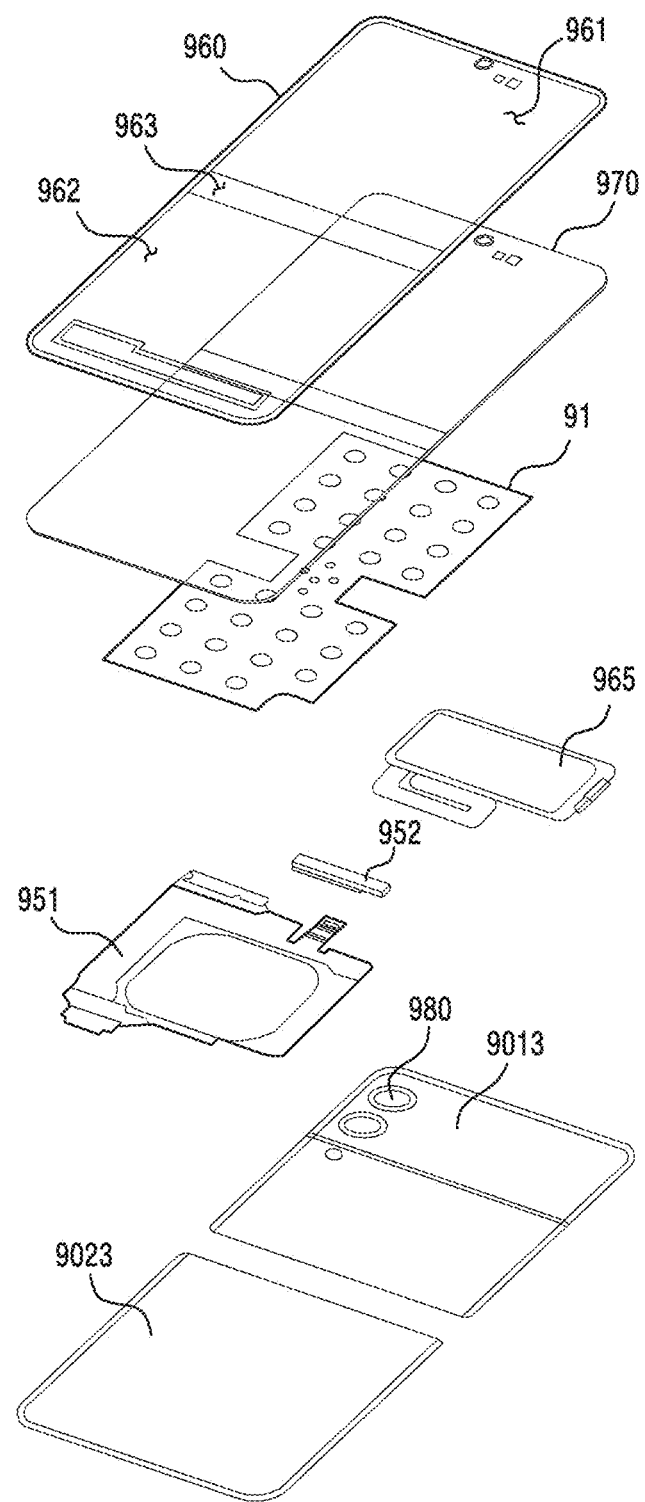
FIG. 9C is an exploded perspective view of an electronic device according to another embodiment.

FIG. 9A illustrates an electronic device in an unfolded state, according to another embodiment. FIG. 9B illustrates the electronic device in a folded state, according to another embodiment. FIG. 9C is an exploded perspective view of the electronic device according to another embodiment.

Referring to FIG. 9A and FIG. 9B together, in an embodiment, an electronic device 901 may include a foldable housing 910 (hereinafter referred to as the "housing" 910) and a flexible or foldable display 960 (hereinafter referred to as the "display" 960) disposed in a space formed by the housing 910. This document defines a surface where the display 960 is disposed as a first surface or a front surface of the electronic device 901. The opposite surface of the front surface is defined as a second surface or a rear surface of the electronic device 901. In addition, a surface surrounding a space between the front surface and the rear surface is defined as a third surface or a side surface of the electronic device 901. According to an embodiment, the electronic device 901 may refer to the electronic device 101 of FIG. 1.

In an embodiment, the electronic device 901 may have a substantially rectangular shape, in the unfolded state of FIG. 9A. For example, the electronic device 901 may have a designated width W2 and a designated length L2 which is longer than the designated width W2. As another example, the electronic device 901 may have a designated width W2 and a designated length L2 which is substantially equal to, or shorter than the designated width W2. According to an embodiment, the electronic device 901 may be folded or unfolded about a folding axis C which is substantially parallel to a short edge (e.g., an edge facing the X axis direction among edges of the electronic device 901 of FIG. 9A) of the rectangle.

In an embodiment, the housing 910 may include a first part 911, a second part 912, and a connection portion 913. The connection portion 913 may be disposed between the first part 911 and the second part 912. The connection portion 913 may be coupled with the first part 911 and the second part 912, and the first part 911 and/or the second part 912 may rotate based on the connection portion 913 (or the folding axis C).

In an embodiment, the first part 911 may include a first side member 9011 and a first rear cover 9013. In an embodiment, the second part 912 may include a second side member 9021 and a second rear cover 9023.

In an embodiment, the first side member 9011 may extend along the edges of the first part 911, and form at least a part of the side surface of the electronic device 901. The first side member 9011 may include at least one conductive portion formed with a conductive material (e.g., metal). The conductive portion may serve as an antenna radiator for transmitting and/or receiving an RF signal. Similarly to the first side member 9011, the second side member 9021 may form a part of the side surface of the electronic device 901, and at least a part of the second side member 9021 may be formed with a conductive material to serve as the antenna radiator. The first side member 9011 and the second side member 9021 may refer to the first side member 2011 and the second side member 2021 of FIG. 2A respectively.

In an embodiment, the first side member 9011 and the second side member 9021 may be disposed on both sides of the folding axis C, and may have a substantially symmetric shape with respect to the folding axis C.

In an embodiment, the first side member 2011 and the second side member 2021 may differ in the angle or the distance depending on whether the state of the electronic device 901 is the unfolded state, the folded state, or the intermediate state.

In an embodiment, the display 960 may include a flexible display which may transform into a flat surface or a curved surface in at least some area. In an embodiment, the display 960 may include a folding area 963, a first area 961 and a second area 963. The folding area 963 may be extended along the folding axis C, the first area 961 may be disposed on one side (e.g., a left side of the folding area 963 shown in FIG. 9A) of the folding area 963, and the second area 962 may be disposed on the other side (e.g., a right side of the folding area 963 shown in FIG. 9A). As yet another example, the first area 961 may be an area disposed in the first part 911, and the second area 262 may be an area disposed in the second part 912. The folding area 963 may be an area disposed in the connection portion 913.

The area division of the display 960 shown in FIG. 9A is exemplary, and the display 960 may be divided into a plurality of (e.g., four or more or two) areas according to its structure or function. For example, the embodiment shown in FIG. 9A may divide the areas of the display 960 by the folding area 963 or the folding axis C, but the display 960 may divide areas based on other folding area (e.g., the folding area 263 of FIG. 2A) or other folding axis (e.g., the folding axis A of FIG. 2A) in another embodiment.

In an embodiment, the first rear cover 9013 may be disposed in the first part 911 on the rear surface of the electronic device 901. The first rear cover 9013 may have substantially rectangular edges. Similarly to the first rear cover 9013, the second rear cover 9023 may be disposed in the second part 912 on the rear surface of the electronic device 901.

In an embodiment, the first rear cover 9013 and the second rear cover 9023 may have a substantially symmetrical shape about the folding axis C. Notably, the first rear cover 9013 and the second rear cover 9023 do not always have a symmetrical shape, and the electronic device 901 may include the first rear cover 9013 and/or the second rear cover 9023 of various shapes, in another embodiment. In yet another embodiment, the first rear cover 9013 may be integrated with the first side member 9011, and the second rear cover 9023 may be integrated with the second side member 9021.

In an embodiment, the first rear cover 9013, the second rear cover 9023, the first side member 9011, and the second side member 9021 may form a space for mounting various components (e.g., a printed circuit board, or a battery) of the electronic device 901.

In an embodiment, a rear camera 980 may be visually exposed through at least one area of the second rear cover 9023. As another example, the rear camera 980 may be disposed in one area of the rear surface of the electronic device 901.

The housing 910 of the electronic device 901 is not limited to the shape and the coupling shown in FIG. 9A and FIG. 9B, and may be implemented by a combination and/or a coupling of other shapes or components.

In an embodiment, the housing 910 may form a recess for accommodating the display 960. The recess may correspond to a shape of the display 960.

In an embodiment, the display 960 may be disposed in a space formed by the housing 910. For example, the display 960 may be received on the recess formed by the housing 910, to form most of the front surface of the electronic device 901. For example, the front surface of the electronic device 901 may include the display 960 and some area of the first side member 9011 and some area of the second side surface 9021 which are adjacent to the display 960. As another example, the rear surface of the electronic device 901 may include the first rear cover 9013, some area of the first side member 9011 adjacent to the first rear cover 9013, the second rear cover 9023 and some area of the second side member 9021 adjacent to the second rear cover 9023.

In an embodiment, the first area 961 and the second area 962 may have a symmetric shape about the folding axis 963. Notably, unlike the second area 262, the first area 961 may include a cut notch to accommodate a sensor area, but may have a symmetric shape with the first area 961 in other areas. For example, the first area 961 and the second area 962 may include a portion having a symmetric shape, and another portion having an asymmetric shape.

Hereafter, the operations of the first side member 9011 and the second side member 9021 and each area of the display 960 according to the state (e.g., the flat state and the unfolded state) of the electronic device 901 are described.

In an embodiment, if the electronic device 901 is in the folded state (e.g., FIG. 9A), the first side member 9011 and the second side member 9021 may be disposed to form the angle of about 180 degrees and to face the same direction. The surface of the first area 961 and the surface of the second area 962 of the display 960 may form about 180 degrees, and face substantially the same direction (e.g., the front direction of the electronic device). For example, the folding area 963 may form the same plane as the first area 961 and the second area 962.

In an embodiment, if the electronic device 901 is in the folded state (e.g., FIG. 9B), the first side member 9011 and the second side member 9021 may be disposed to face each other. The surface of the first area 961 and the surface of the second area 962 of the display 960 may form a narrow angle (e.g., between 0 degree and 10 degrees), and face each other. For example, the folding area 963 may include a curved surface of which at least a part has a specific curvature.

In an embodiment, if the electronic device 901 is in the intermediate state, the first side member 9011 and the second side member 9021 may be disposed at a certain angle. The surface of the first area 961 and the surface of the second area 962 of the display 960 may form an angle greater than the folded state and smaller than the flat state. The folding area 963 may include a curved surface of which at least a part has specific curvature, wherein the curvature may be smaller than the folded state.

Referring to FIG. 9B, the connection portion 913 may be implemented to rotate the first part 911 and the second part 912 mutually. For example, the connection portion 913 may include a hinge coupled with the first part 911 and the second part 912.

Referring to FIG. 9C, the electronic device 901 according to an embodiment may include the display 960, a first layer 970 disposed below the display 960, a graphite 91 disposed below the first layer 970, a sub display 965 exposed at least in part through the first rear cover 9013 and an antenna pattern 951 and an antenna module 952 disposed inside the housing 910.

According to an embodiment, the first layer 970 disposed below the display 960 may refer to the first layer 310 of FIG. 3. According to an embodiment, the first layer 970 may have a lattice pattern in at least one area, and may be folded or unfolded.

According to an embodiment, the antenna pattern 951 disposed inside the housing 910 may be referred to as, but not limited to, a multi-function core (MFC) antenna. As another example, the antenna pattern 951 may be referred to as a magnetic secure transmission (MST) antenna or a near field communication (NFC) antenna.

According to an embodiment, a wireless communication circuit (e.g., the wireless communication circuit 410 of FIG. 4) may transmit and/or receive signals of a designated frequency band (e.g., about 6 GHz) through the antenna module 952.

According to an embodiment, the electronic device 901 of FIG. 9A through FIG. 9C may refer to the electronic device 101 of FIG. 2A through FIG. 2C, and the structure of FIG. 3 through FIG. 8C may be applied in the same manner.

An electronic device 101 according to an embodiment may include a housing 200 including a first housing 200 which forms a first side surface 501 of the electronic device 101, a second housing 200 which forms a second side surface corresponding to the first side surface 501 and a hinge (e.g., the connection portion 203 of FIG. 2A) which connects the first housing 200 and the second housing 200, and switches between a folding state or an unfolding state based on the hinge, a wireless communication circuit (e.g., the wireless communication module 192 of FIG. 1) disposed inside the housing 200, and transmitting and receiving signals of a designated frequency band by supplying power to at least a part of the housing 200 and a display structure (e.g., the display 260 of FIG. 3) coupled with the housing 200, the display structure may include a cover glass 340 for forming at least a part of a front surface of the electronic device 101, a display panel 330 disposed adjacent to one surface of the cover glass 340, and a first layer 310 disposed below the display panel 330, and including a dielectric, the first layer 310 may include a first area (e.g., the first area 311 of FIG. 5) adjacent to the hinge and including a lattice pattern (e.g., the lattice pattern 570 of FIG. 5) and a second area (e.g., the second area 312 of FIG. 5) excluding or outside of the first area, a first edge of the first area may be spaced away from the first side surface 501 by a first distance D1, a second edge of the second area may be spaced away from the first side surface 501 by a second distance D2 which is greater than the first distance D1, and at least a part of the housing 200 may be connected with a ground through a conductive connection member 540 disposed at a first point 541 spaced away from the first side surface 501 by a third distance D3 which is smaller than the first distance D1.

The display structure according to an embodiment may include a second layer 320 disposed below the first layer 310, and the second layer 320 may include at least one of a digitizer 321 or a metal plate 322.

According to an embodiment, an edge of an area corresponding to the second area of the first area 310 in the second layer 320 may be spaced away from the first side surface 501 by a fourth distance D4 which is greater than the second distance D2.

According to an embodiment, an edge of an area corresponding to the first area of the first layer 310 in the second layer 320 may be spaced away from the first side surface 501 by a fifth distance D5 which is greater than the second distance D2.

According to an embodiment, the dielectric may have permittivity over 150.

According to an embodiment, the first layer 310 may include a CFRP.

The electronic device 101 according to an embodiment may include a printed circuit board 520 disposed inside the housing 200, and the conductive connection member 540 may be electrically connected with the printed circuit board 520 through the first point 541.

According to an embodiment, at least the part of the housing 200 may be connected with a second point of the printed circuit board 520 spaced away from the first side surface 501 by the third distance D3 which is greater than the first distance D1 and smaller than the second distance D2, and the wireless communication circuit may supply power to at least a part of the housing 200 through the second point.

The wireless communication circuit according to an embodiment may transmit and/or receive signals of a designated frequency band by supplying power to a first electrical path including at least a part of the housing 200, the conductive connection member 540 and the ground.

The conductive connection member 540 according to an embodiment may include a C-clip.

An electronic device 101 according to an embodiment may include a housing 200 including a first housing 200 which forms a first side surface 501 of the electronic device 101, a second housing 200 which forms a second side surface corresponding to the first side surface 501 and a hinge which connects the first housing 200 and the second housing 200, and switches between a folding state or an unfolding state based on the hinge, a printed circuit board 520 inside the housing 200, a wireless communication circuit (e.g., the wireless communication module 192 of FIG. 1) electrically connected with the printed circuit board 520, and transmitting and receiving signals of a designated frequency band by supplying power to at least a part of the housing 200 and a display structure coupled with the housing 200, the display structure may include a cover glass 340 for forming at least a part of a front surface of the electronic device 101, a display panel 330 disposed adjacent to one surface of the cover glass 340, and a first layer 310 disposed below the display panel 330, and including a dielectric, the first layer 310 may include a first area (e.g., the first area 311 of FIG. 5) adjacent to the hinge and including a lattice pattern (e.g., the lattice pattern 570 of FIG. 5) and a second area (e.g., the second area 312 of FIG. 5) excluding or outside of the first area, a first edge of the first area may be spaced away from the first side surface 501 by a first distance D1, a second edge of the second area may be spaced away from the first side surface 501 by a second distance D2 which is greater than the first distance D1, and at least a part of the housing 200 may be electrically connected with a first point 541 of the printed circuit board 520, spaced away from the first side surface 501 by a third distance D3 which is smaller than the first distance D1.

According to an embodiment, at least a part of the housing 200 may be electrically connected with the printed circuit board 520 through a conductive connection member 540 disposed at the first point 541 of the printed circuit board 540.

According to an embodiment, the wireless communication circuit may transmit and/or receive signals of the designated frequency band by supplying power to at least a part of the housing 200 through the first point 541.

At least a part of the housing 200 according to an embodiment may be electrically connected with a ground area of the printed circuit board 520 through the first point 541.

The display structure according to an embodiment may include a second layer 520 disposed below the first layer 310, and the second layer 320 may include at least one of a digitizer 321 or a metal plate 322.

According to an embodiment, an electronic device 101 may include a housing 200 including a first housing 200 which forms a first side surface 501 of the electronic device 101, a second housing 200 which forms a second side surface corresponding to the first side surface 501 and a hinge which connects the first housing 200 and the second housing 200, and switches between a folding state or an unfolding state based on the hinge, a wireless communication circuit (e.g., the wireless communication module 192 of FIG. 1) disposed inside the housing 200, and transmitting and receiving signals of a designated frequency band by supplying power to at least a part of the housing 200 and a display structure coupled with the housing 200, the display structure may include a cover glass 340 for forming at least a part of a front surface of the electronic device 101, a display panel 330 disposed adjacent to one surface of the cover glass 340, and a first layer 310 disposed below the display panel 330, and including a dielectric, the first layer 310 may include a first area including a first lattice pattern (e.g., the first lattice pattern 571 of FIG. 8B) formed adjacent to the hinge, a second area including a second lattice pattern (e.g., the second lattice pattern 572 of FIG. 8B) formed away or separated at a distance from the first lattice pattern and a third area formed between the first area and the second area, a first edge of the first area and a second edge of the second area may be spaced away from the first side surface 501 by a first distance D1, a third edge of the third area may be spaced away from the first side surface 501 by a second distance D2 which is greater than the first distance D1, and at least a part of the housing may be connected with a ground through a conductive connection member 540 disposed at a first point 541 spaced away from the first side surface 501 by a third distance D3 which is smaller than the second distance D2.

According to an embodiment, the first layer 310 may include a third lattice pattern (e.g., the third lattice pattern 573 of FIG. 8B) formed at a position corresponding to the second lattice pattern based on the first area.

According to an embodiment, the first layer 310 may include a first conductive plate which includes the first area and has first permittivity, and a second conductive plate which includes the second area and has second permittivity smaller than the first permittivity.

According to an embodiment, the first conductive plate and the second conductive plate may be coupled through a nonconductive material.

According to an embodiment, the first conductive plate and the second conductive plate may be spaced away from each other with a gap (e.g., the gap 850 of FIG. 8D).

The invention claimed is:

1. An electronic device comprising:
  a housing comprising:
    a first housing, which forms a first side surface of the electronic device;
    a second housing, which forms a second side surface corresponding to the first side surface; and
    a hinge, which connects the first housing and the second housing,
  the housing being configured to switch between a folding state or an unfolding state based on the hinge;
  a wireless communication circuit disposed inside the housing, and configured for transmitting and receiving signals of a designated frequency band by supplying power to at least a part of the housing; and
  a display structure coupled with the housing and comprising:
    a cover glass for forming at least a part of a front surface of the electronic device,
    a display panel disposed adjacent to one surface of the cover glass, and
    a first layer disposed below the display panel and comprising a dielectric,
  wherein the first layer comprises a first area adjacent to the hinge and comprising a lattice pattern and a second area excluding the first area,
  a first edge of the first area is spaced away from the first side surface by a first distance,
  a second edge of the second area is spaced away from the first side surface by a second distance which is greater than the first distance, and
  at least a part of the housing is connected with a ground through a conductive connection member disposed at a first point spaced away from the first side surface by a third distance which is smaller than the second distance.

2. The electronic device of claim 1, wherein the display structure comprises a second layer disposed below the first layer, wherein the second layer comprises at least one of a digitizer or a metal plate.

3. The electronic device of claim 2, wherein an edge of an area corresponding to the second area of the first layer in the second layer is spaced away from the first side surface by a fourth distance which is smaller than the second distance.

4. The electronic device of claim 2, wherein an edge of an area corresponding to the first area of the first layer in the second layer is spaced away from the first side surface by a fifth distance which is greater than the first distance.

5. The electronic device of claim 1, wherein the dielectric has permittivity over 150.

6. The electronic device of claim 1, wherein the first layer comprises a carbon fiber reinforced plastic (CFRP).

7. The electronic device of claim 1, wherein the electronic device comprises a printed circuit board disposed inside the housing, and
the conductive connection member is electrically connected with the printed circuit board through the first point.

8. The electronic device of claim 7, wherein at least the part of the housing is connected with a second point of the printed circuit board spaced away from the first side surface by the third distance which is greater than the first distance and smaller than the second distance, and
the wireless communication circuit is configured to supply power to at least a part of the housing through the second point.

9. The electronic device of claim 1, wherein the wireless communication circuit is configured to transmit and receive signals of a designated frequency band by supplying power to a first electrical path comprising at least a part of the housing, the conductive connection member and the ground.

10. The electronic device of claim 1, wherein the conductive connection member comprises a C-clip.

11. An electronic device comprising:
a housing comprising:
a first housing, which forms a first side surface of the electronic device;
a second housing, which forms a second side surface corresponding to the first side surface, and
a hinge, which connects the first housing and the second housing,
the housing being configured to switch between a folding state or an unfolding state based on the hinge;
a printed circuit board inside the housing;
a wireless communication circuit electrically connected with the printed circuit board, and configured for transmitting and receiving signals of a designated frequency band by supplying power to at least a part of the housing; and
a display structure coupled with the housing and comprising:
a cover glass for forming at least a part of a front surface of the electronic device,
a display panel disposed adjacent to one surface of the cover glass, and
a first layer disposed below the display panel and comprising a dielectric,
wherein the first layer comprises a first area adjacent to the hinge and comprising a lattice pattern and a second area excluding the first area,
a first edge of the first area is spaced away from the first side surface by a first distance,
a second edge of the second area is spaced away from the first side surface by a second distance which is greater than the first distance, and at least a part of the housing is electrically connected with a first point of the printed circuit board, spaced away from the first side surface by a third distance which is smaller than the second distance.

12. The electronic device of claim 11, wherein at least a part of the housing is electrically connected with the printed circuit board through a conductive connection member disposed at the first point of the printed circuit board.

13. The electronic device of claim 11, wherein the wireless communication circuit is configured to transmit and receive signals of the designated frequency band by supplying power to at least a part of the housing through the first point.

14. The electronic device of claim 11, wherein at least a part of the housing is electrically connected with a ground area of the printed circuit board through the first point.

15. The electronic device of claim 11, wherein the display structure comprises a second layer disposed below the first layer,
wherein the second layer comprises at least one of a digitizer or a metal plate.

16. An electronic device comprising:
a housing comprising:
a first housing, which forms a first side surface of the electronic device;
a second housing, which forms a second side surface corresponding to the first side surface; and
a hinge, which connects the first housing and the second housing,
the housing being configured to switch between a folding or unfolding state based on the hinge;
a wireless communication circuit disposed inside the housing, and configured for transmitting and receiving signals of a designated frequency band by supplying power to at least a part of the housing; and
a display structure coupled with the housing and comprising:
a cover glass for forming at least a part of a front surface of the electronic device,
a display panel disposed adjacent to one surface of the cover glass, and
a first layer disposed below the display panel and comprising a dielectric,
wherein the first layer comprises a first area comprising a first lattice pattern formed adjacent to the hinge, a second area comprising a second lattice pattern formed away or separated at a distance from the first lattice pattern and a third area formed between the first area and the second area,
a first edge of the first area and a second edge of the second area are spaced away from the first side surface by a first distance,
a third edge of the third area is spaced away from the first side surface by a second distance which is greater than the first distance, and
at least a part of the housing is connected with a ground through a conductive connection member disposed at a first point spaced away from the first side surface by a third distance which is smaller than the second distance.

17. The electronic device of claim 16, wherein the first layer comprises a third lattice pattern formed at a position corresponding to the second lattice pattern based on the first area.

18. The electronic device of claim 16, wherein the first layer comprises a first conductive plate which comprises the first area and has first permittivity, and a second conductive plate which comprises the second area and has second permittivity smaller than the first permittivity.

19. The electronic device of claim 18, wherein the first conductive plate and the second conductive plate are coupled through a nonconductive material.

20. The electronic device of claim 18, wherein the first conductive plate and the second conductive plate are spaced away from each other with a gap.

\* \* \* \* \*